(12) United States Patent
Terasawa et al.

(10) Patent No.: US 6,173,987 B1
(45) Date of Patent: Jan. 16, 2001

(54) AIR BAG APPARATUS

(75) Inventors: Tomozane Terasawa; Yasuhiro Lino, both of Yokohama; Yosuke Matsushima, Sagamihara; Hirohito Nishimura, Yokohama, all of (JP)

(73) Assignee: Bridgestone Corporation, Tokyo (JP)

( * ) Notice: Under 35 U.S.C. 154(b), the term of this patent shall be extended for 652 days.

(21) Appl. No.: 08/878,769

(22) Filed: Jun. 19, 1997

Related U.S. Application Data

(63) Continuation of application No. 08/345,805, filed on Nov. 22, 1994, now abandoned.

(30) Foreign Application Priority Data

Nov. 22, 1993 (JP) .................................................. 5-292177
Mar. 3, 1994 (JP) .................................................. 6-033328

(51) Int. Cl.[7] .................................................. B60R 21/16
(52) U.S. Cl. .................................. 280/728.2; 280/728.3; 280/731
(58) Field of Search ........................... 280/728.1, 728.2, 280/728.3, 731

(56) References Cited

U.S. PATENT DOCUMENTS 5,201,541   4/1993   Jones et al. .
5,284,359   2/1994   Baba .
5,470,101 * 11/1995  Ennis ................................ 280/728.2

FOREIGN PATENT DOCUMENTS 3528819    8/1987   (DE) .
4414743   11/1994   (DE) .
2443602   11/1979   (FR) .
2662411   11/1991   (FR) .
2715902    4/1994   (FR) .
2037204    7/1980   (GB) .
110643     8/1980   (JP) .
184549     7/1988   (JP) .
1-160756 *  6/1989   (JP) .................................... 280/728.2
427639     1/1992   (JP) .

* cited by examiner

Primary Examiner—Eric Culbreth
(74) Attorney, Agent, or Firm—Sughrue, Mion, Zinn, Macpeak & Seas, PLLC

(57) ABSTRACT

The invention provides an air bag apparatus which is simple in structure and light in weight while assuring a sufficient strength and wherein a pad cover can be mounted readily onto a base plate by a simplified mounting apparatus. The air bag apparatus has at least an air bag for protecting a driver of a vehicle upon collision of the vehicle, a base plate for mounting thereon a gas generator for inflating the air bag, and a pad cover secured to the base plate for accommodating the air bag and the gas inflator therein. A portion of the base plate is deformed into a predetermined shape to secure the pad cover to the base plate. Preferably, a portion of the base plate is bent to form a side inner face portion and is further folded back to form a side outer face portion, and a terminal portion of the pad cover is held between and secured by the side outer face portion and the side inner face portion of the base plate.

4 Claims, 17 Drawing Sheets

AIR BAG APPARATUS

This is a Continuation of application Ser. No. 08/345,805 filed Nov. 22, 1994, now abandoned.

BACKGROUND OF THE INVENTION

1. Field of the Invention

This invention relates to an air bag apparatus mounted on a steering wheel, front instrument panel, front door trim or the like of an automobile. More particularly it relates to an apparatus for mounting and securing a pad cover onto and to a base plate mounted on a steering wheel, front instrument panel, front door trim or the like by way of a mounting plate or a like element.

The present invention relates also to a process for assembling an air bag apparatus for an automobile, and more particularly to an assembling method and an assembling apparatus for fastening a pad cover and a base plate of an air bag apparatus to each other.

The pad cover is generally referred to "module cover", "receiving cover, "lid", "cover door" or "deployment door" and is used as a case or housing for receiving an air bag or acting as cushioning.

2. Description of the Prior Art

Conventionally, a mounting apparatus for an air bag apparatus of the type mentioned for fixedly mounting on a base plate a pad cover in which an air bag, a gas generator and so forth are accommodated is disclosed, for example, in Japanese Patent Laid - Open Applications Nos. Showa 55-110643, Showa 63-184549 and Heisei 4-27639.

FIG. 25 shows the mounting apparatus disclosed in Japanese Patent Laid - Open Application No. Heisei 4-27639. Referring to FIG. 25, the mounting apparatus is applied to an air bag apparatus which includes an air bag 21 mounted on a mounting plate 23 and an air bag cover 24 which covers over the air bag 21. An upright portion 26 extends uprightly from a peripheral edge of a flat portion 23A of the mounting plate 23 on which the air bag 21, an inflator 22 and a retainer 18 (a ring - like element for securing the air bag 21 to the mounting plate 23) are mounted. A side circumferential wall 25 of the air bag cover 24 is contacted with and held against the upright portion 26 by a stiffening plate 12, and the elements are secured to each other by means of rivets 13 which extends through them. This particular mounting apparatus is called a "rivet type" mounting apparatus.

Meanwhile, FIG. 26 shows the mounting apparatus disclosed in Japanese Patent Laid - Open Application No. Showa 55-110643. Referring to FIG. 26, the mounting apparatus shown includes a mounting plate 23 to which a circumferential edge of a side circumferential wall 25 of an air bag cover 24, which covers the circumference of an air bag 21, and is snapped by means of a pawl plate 14 and a regulation wall 16 of the mounting plate 23. The pawl plate 14 has an arresting pawl 15 which is inserted in and engaged with an arresting groove 28 formed on an inner circumferential face of the side circumferential wall 25 of the air bag cover 24. The regulation wall 16 of the mounting plate 23 is inserted in an insertion groove 17 formed on a lower end face of the side circumferential wall 25 of the air bag cover 24. This particular mounting apparatus is called a "snap - in type" mounting apparatus.

With the conventional mounting apparatus for mounting a pad cover on a base plate described above, however, whether they are of the rivet type or the snap - in type, a plurality of plates or parts such as mounting plates or pawl plates are required and the structure of the apparatus is complicated. Consequently, the number of steps in production is great and the operability is low, and also the weight is great. As a result, a high cost of manufacture is required. Further, such a great weight of an air bag apparatus which is mounted at a central portion of a steering wheel of an automobile results in a great moment of inertia around the axis of the steering wheel and deteriorates the steering performance of the automobile.

Additionally, in the air bag apparatus described above, in order to fasten the pad cover to the base plate, the base plate and/or the pad cover are positioned using a robot which can operate in directions of two—or three—axes or are manually operated to secure them by means of rivets, bolts or some other suitable fastening members.

To this end, such rivets, bolts or some other fastening members must be inserted accurately into predetermined holes of the pad cover and the base plate. Accordingly, the operability in assembly to secure the quality assurance is low.

SUMMARY OF THE INVENTION

It is an object of the present invention to provide an air bag apparatus of reduced weight which, solving the various subjects of the conventional air bag apparatus described above, is simple in structure and easy to mount a pad cover easily onto a base plate using a simple mounting apparatus for mounting a pad cover onto a base plate while assuring a sufficient strength.

It is another object of the present invention to provide an assembling method and an assembling apparatus by which an air bag apparatus can be assembled in accordance with a simple fastening method of fastening a pad cover onto a base plate and a base plate can be fastened to a pad cover readily with certainty in a short time to achieve improvement in assembling feasibility and productivity.

In order to attain the objects described above, according to an aspect of the present invention, there is provided an air bag apparatus which at least includes an air bag for protecting a driver of a vehicle upon collision of the vehicle, a base plate for mounting thereon a gas generator for inflating the air bag, and a pad cover secured to the base plate for accommodating the air bag and the gas generator therein, which is constructed such that part of the base plate is deformed into a predetermined shape to secure the pad cover to the base plate. Preferably, a portion of the base plate is bent to form a side inner face portion and is further folded back to form a side outer face portion, and a terminal portion of the pad cover is held between and secured by the side outer face portion and the side inner face portion of the base plate.

Further, pad cover terminal letting off preventing means may be provided on the side outer face portion or the side inner face portion of the base plate, or an arresting groove or an arresting hole for engaging with the letting off preventing means may be provided at the terminal portion of the pad cover.

According to the present invention, since the air bag apparatus which at least includes an air bag for protecting a driver of a vehicle upon collision of the vehicle, a base plate for mounting thereon a gas generator for inflating the air bag, and a pad cover secured to the base plate for accommodating the air bag and the gas generator therein, is constructed such that part of the base plate is deformed into a predetermined shape to secure the pad cover to the base plate, and preferably, part of the base plate is bent to form a side inner face portion and is further folded back to form a side outer face portion and a terminal portion of the pad cover is held between and secured by the side outer face portion and the side inner face portion of the base plate, by deforming part of the base plate into the predetermined shape, the caulking portion is formed. Consequently, the terminal portion of the pad cover can be mounted on the base plate with sufficient strength using a simple structure.

Further, since, as mounting parts, it is required to prepare only the pad cover and the base plate and the base plate itself has a weight which is at an equal level to that of a conventional base plate without requiring any additional member, the air bag apparatus contributes very much to improvement in operability, reduction in part cost and reduction in weight.

Further, where the pad cover terminal letting off preventing means is provided on the side outer face portion or the side inner face portion of the base plate or the arresting groove or the arresting hole for engaging with the letting off preventing means is provided at the terminal portion of the pad cover, it can be prevented fully that the pad cover broken at a planned break line upon operation of the air bag is blown off.

In order to attain the objects described above, according to another aspect of the present invention, there is provided an assembling method for an air bag apparatus wherein caulking portions formed by bending part of a base plate on which an air bag for protecting a driver of a vehicle upon collision of the vehicle and a gas generator for expanding the air bag are mounted hold leg portions of a pad cover in which the air bag and the gas generator are accommodated to secure the pad cover, constructed such that one or a plurality of ones of the caulking portions of the base plate to be caulked to the leg portions of the pad cover are deformed at a time to secure the base plate to the pad cover by means of a cam slide apparatus which is disposed around the air bag apparatus as a work for converting a pressing force in a vertical direction into a caulking force acting in a horizontal direction or acting in a circumferential direction around a fulcrum.

Further, an assembling apparatus for use with the assembling method is constructed such that, in order to deform one or a plurality of ones of the caulking portions of the base plate to be caulked to the leg portions of the pad cover at a time to secure the base plate to the pad cover, a cam slide apparatus for converting a pressing force in a vertical direction into a caulking force acting in a horizontal direction is disposed around the air bag apparatus as a work, and a pressing portion of a press apparatus is disposed above the cam slide apparatus.

In the present invention, since the assembling method for an air bag apparatus wherein caulking portions formed by bending part of a base plate on which an air bag for protecting a driver of a vehicle upon collision of the vehicle and a gas generator for expanding the air bag are mounted hold between leg portions of a pad cover in which the air bag and the gas generator are accommodated to secure the pad cover, is constructed such that one or a plurality of ones of the caulking portions of the base plate to be caulked to the leg portions of the pad cover are deformed at a time to secure the base plate to the pad cover by means of a cam slide apparatus which is disposed around the air bag apparatus as a work for converting a pressing force in a vertical direction into a caulking force acting in a horizontal direction or acting in a circumferential direction around a fulcrum and the assembling apparatus for use with the assembling method is constructed such that, in order to deform one or a plurality of ones of the caulking portions of the base plate to be caulked to the leg portions of the pad cover at a time to secure the base plate to the pad cover, a cam slide apparatus for converting a pressing force in a vertical direction into a caulking force acting in a horizontal direction is disposed around the air bag apparatus as a work, and a pressing portion of a press apparatus is disposed above the cam slide apparatus, if the air bag apparatus as a work wherein the leg portions of the pad cover for accommodating the air bag therein are temporarily placed on the caulking portions of the base plate on which the air bag is mounted is placed properly onto the work receiving table substantially at the central portion of the press base and the pressing portion of the press work moves down to start its compression operation, the press blocks of the cam slide apparatus disposed on the press base are pressed downwardly, whereupon the inclined cam faces at the lower ends of the press blocks act upon the cam faces of the caulking blocks of the cam slide apparatus to slidably move the caulking blocks in horizontal directions to deform the caulking portions of the base plate. Consequently, the caulking portions of the base plate are fastened and secured firmly to the leg portions of the pad cover.

Since the press blocks and the caulking blocks of the cam slide apparatus are disposed by a suitable plural number around the work, a corresponding number of ones of the caulking portions are caulked at a time by the corresponding caulking blocks by a downward compression operation of the pressing portion of the press apparatus. Thus, by preparing only the pad cover and the base plate as mounting parts, an air bag apparatus which realizes reduction in part cost and reduction in weight and is sufficiently improved in strength while having a simple structure can be assembled readily with certainty in a short time. This contributes very much to improvement in assembling feasibility and productivity.

DESCRIPTION OF THE PREFERRED EMBODIMENTS

Figure 1:
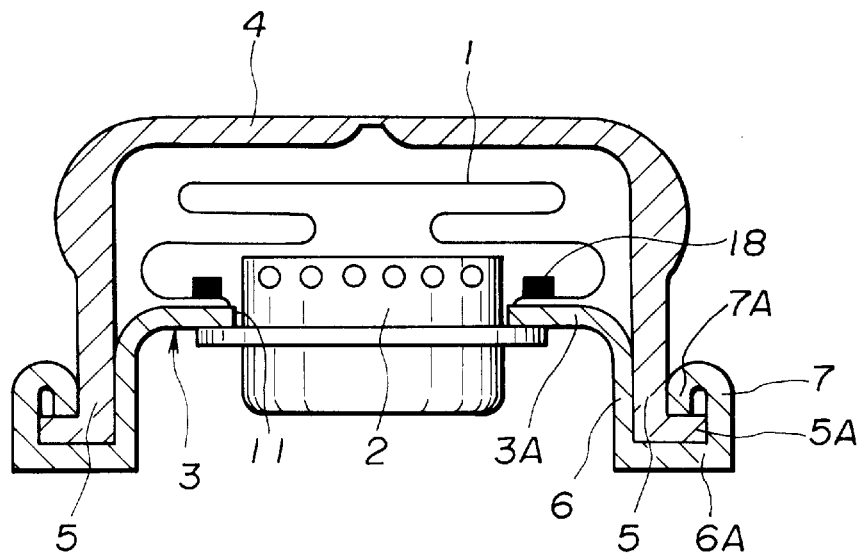
FIG. 1 is a section view showing an air bag apparatus according to a first embodiment of the present invention.
Figure 2:
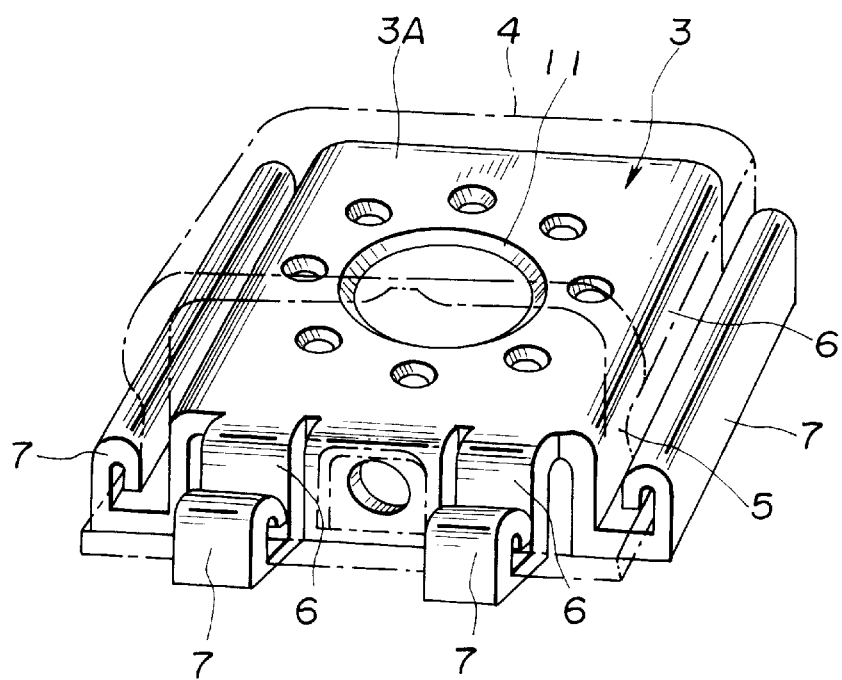
FIG. 2 is a perspective view showing a base plate of the air bag apparatus of FIG. 1.

Referring first to FIGS. 1 and 2, there is shown an air bag apparatus according to a first preferred embodiment of the present invention. The air bag apparatus shown includes an air bag 1, a gas generator 2 for expanding or inflating the air bag 1, and a retainer 18 for mounting the air bag 1 on a base plate 3. The air bag 1, the gas generator 2, the retainer 18 and so forth are mounted on a flat plate portion 3A of the base plate 3.

As seen from the perspective view of the base plate 3 of FIG. 2, the gas generator 2 is inserted in and attached to a mounting hole 11 at the center of the flat plate portion 3A of the base plate 3.

In the present embodiment, the air bag 1, the gas generator 2 and so forth are accommodated in a pad cover 4, and a plurality of terminal portion flanges 5A are provided at lower ends of a plurality of terminal portions 5 of the pad cover 4 such that they extend in parallel to the flat plate portion 3A of the base plate 3.

Meanwhile, the base plate 3 has a plurality of side inner face portions 6 formed by bending a portion of the same in a downward direction, that is, in the direction away from a passenger of a vehicle in which the air bag apparatus is incorporated. A bottom portion 6A is formed contiguously to each of the side inner face portions 6 by bending the same outwardly such that it extends in parallel to the flat plate portion 3A. A lower end of the terminal portion 5 of the pad cover 4 having the terminal portion flange 5A thereon is disposed along a side inner face portion 6 and a corresponding bottom portion 6A. The bottom portion 6A is further folded back in such a manner to surround the terminal portion flange 5A to form a side outer face portion 7 so that the terminal portion 5 of the pad cover 4 is held between and secured to the side outer face portion 7 and the side inner face portion 6 to form a caulking portion.

Each of the side outer face portions 7 is further folded back to form a terminal holding portion 7A serving as a letting off preventing means for preventing letting off of the terminal portion 5 of the pad cover 4 from the base plate 3. The terminal holding portion 7A may alternatively be formed as a riser element or elements 9A of FIG. 11 which will be hereinafter described. It is to be noted that the manner in which the terminal portion 5 of the pad cover 4 is held between and secured to the caulking portion which is constituted from a side inner face portion 6, a bottom portion 6A, a side outer face portion 7 and a terminal holding portion 7A is only required that letting off of the terminal portion 5 of the pad cover 4 from the base plate 3 be prevented and includes not only a caulking condition wherein the side outer face portion 7 or the terminal holding portion 7A bites into the terminal portion 5 of the pad cover 4 to such a degree that the terminal portion 5 is deformed but also a condition wherein the caulking portion and the terminal portion 5 of the pad cover 4 hold each other suitably or in a somewhat loose condition.

While the side inner face portions 6 and the side outer face portions 7 on the opposite sides of the base plate 3 are formed continuously in FIG. 2, the side inner face portion 6 and the side outer face portion 7 on the front side are formed intermittently to hold and secure the terminal portion 5 of the pad cover 4 to caulk the latter.

Since the air bag apparatus is constructed in such a manner as described above, the caulking portions are formed by deforming a portion of the base plate 3 into a predetermined shape, and the terminal portions 5 of the pad cover 4 can be mounted on the base plate 3 with a sufficient degree of strength with a simple structure by way of the caulking portions.

As mounting parts, it is only required to prepare the pad cover and the base plate. This can contribute very much to the improvement in operability, a reduction in part cost and a reduction in weight. Further, since the terminal holding portions 7A as means for preventing letting off of the terminal portions 5 of the pad cover 4 are provided on the side outer face portions 7 to control upper portions of the terminal portion flanges 5A of the terminal portions 5 of the pad cover 4, such a situation that the pad cover 4 broken upon operation of the air bag 1 is blown off can be prevented effectively.

Figure 3A:
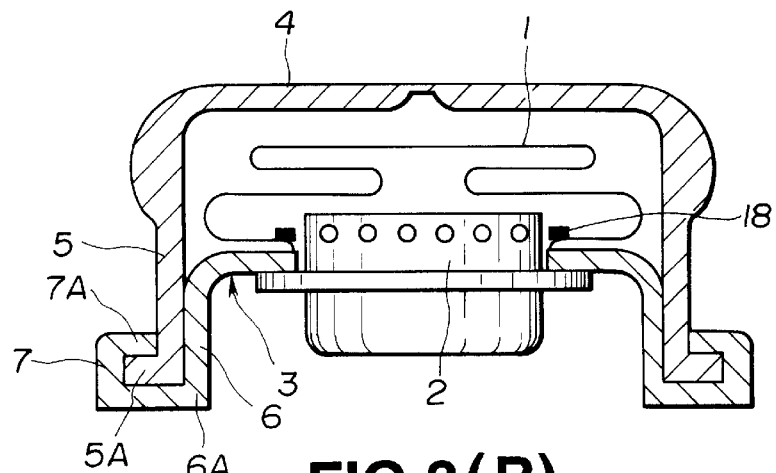
FIGS. 3(A) and 3(B) are a sectional view and an exploded perspective view, respectively, showing an air bag apparatus according to a second embodiment of the present invention.
Figure 3B:
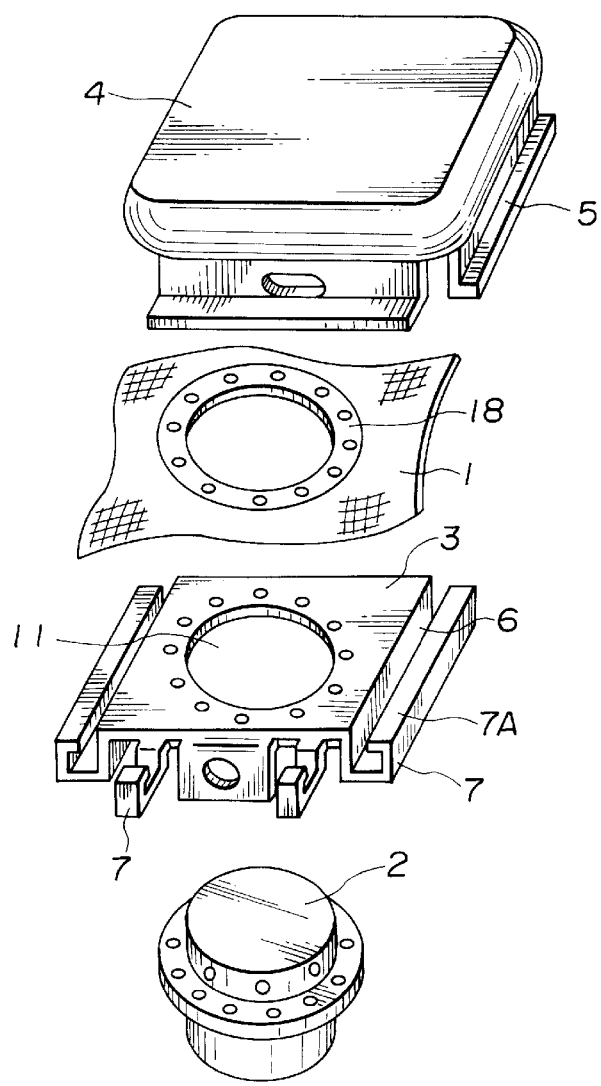

FIGS. 3(A) and 3(B) show an air bag apparatus according to a second preferred embodiment of the present invention.

The air bag apparatus of the present embodiment is similar to the air bag apparatus of the first embodiment shown in FIG. 1 but is different in that the terminal holding portions 7A serving as means provided on the side outer face portions 7 for preventing letting off of the terminal portions 5 of the pad cover 4 are formed not by folding back the side outer face portions 7 as in the first embodiment but by bending the side outer face portions 7 in parallel to the bottom portions 6A of the base plate 3 in such a manner to surround the terminal portion flanges 5A of the terminal portions 5 of the pad cover 4.

In this embodiment, the terminal holding portions 7A can be formed only by bending the side outer face portions 7 in parallel to the bottom portions 6A of the base plate 3, and processing of the end portions of the side outer face portions 7 is comparatively easy.

FIG. 3(B) is an exploded perspective view of the air bag apparatus according to the second embodiment of the present invention.

As seen from FIG. 3(B), a head portion of the gas generator 2 is inserted in the mounting hole 11 of the base plate 3, and the air bag 1 is held from above by the retainer 18. The retainer 18, the air bag 1, the base plate 3 and the gas generator 2 are secured to each other by means of through - bolts or some other suitable means. Further, the terminal portions 5 of the pad cover 4 can be secured with certainty without letting off to the caulking portions, which are constituted from the side inner face portions 6 and side outer face portions 7 formed on the side faces of the base plate 3 and the terminal holding portions 7A, with a simple construction.

Figure 4:
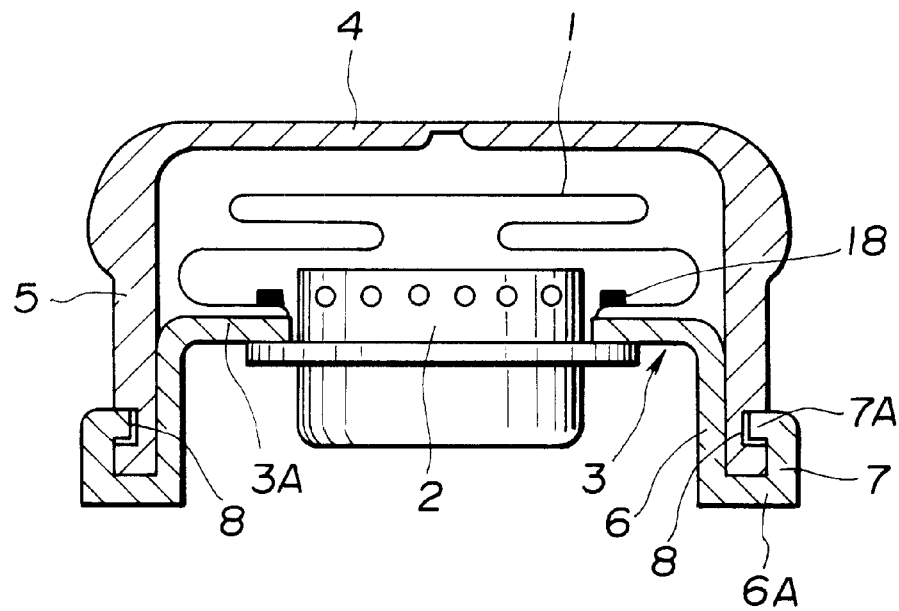
FIG. 4 is a sectional view of the air bag apparatus of FIGS. 3(A) and 3(B)

FIG. 4 illustrates an air bag apparatus according to a third preferred embodiment of the present invention. While the air bag apparatus of the present embodiment is similar in constructing the side outer face portion 7 and the terminal holding portion 7A of the base plate 3 to the air bag apparatus of the second embodiment of FIG. 3 described above, in the present embodiment, the terminal portion 5 of the pad cover 4 does not have the terminal portion flanges 5A provided in parallel to the flat plate portion 3A but is formed straight, and has arresting grooves 8 formed therein for engaging with the terminal holding portions 7A of the base plate 3.

Due to the construction, the terminal portions 5 of the pad cover 4 can be formed in a straight shape, which simplifies the structure.

Figure 5:
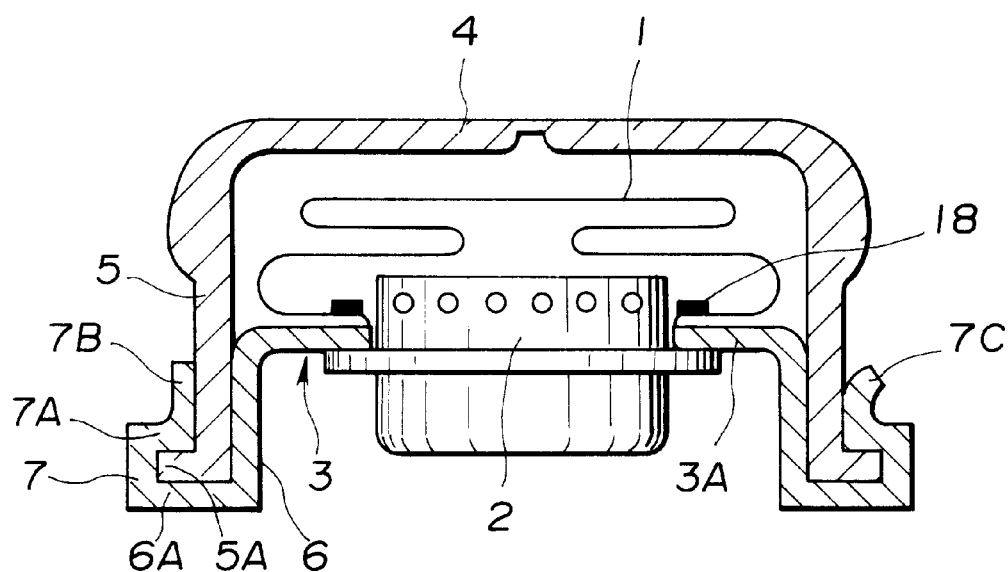
FIG. 5 is a sectional view showing an air bag apparatus according to a fourth embodiment of the present invention.

FIG. 5 shows an air bag apparatus according to a fourth preferred embodiment of the present invention. The air bag apparatus of this embodiment is similar in shape of the base plate 3 and the terminal portions 5 of the pad cover 4 to the air bag apparatus of the second embodiment of FIG. 3 described above. However, in the present embodiment, the terminal holding portions 7A of the base plate 3 in the second embodiment are further bent upwardly to form accompanying portions 7B parallel to the side inner face portions 6.

Due to this construction, the pressures of the caulking faces of the terminal holding portions 7A to the terminal portions 5 of the pad cover 4 can be reduced to allow sure holding of and a reduction of damage to the terminal portions 5 of the pad cover 4. Further, as shown on the outside in FIG. 5, an escape portion 7C may be formed at an upper end of an accompanying portion or portions 7B in order to prevent side wall faces of the terminal portions 5 of the pad cover 4 from being damaged by edges at the upper ends of the accompanying portions 7B upon caulking.

Figure 6A:
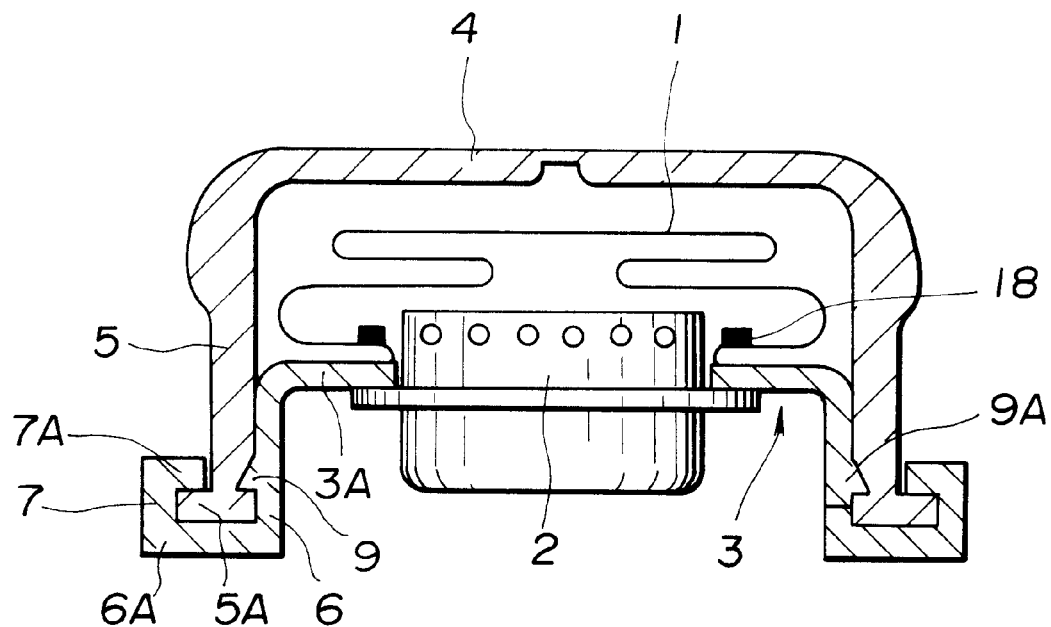
FIGS. 6(A) and 6(B) are a sectional view and a partial enlarged sectional view, respectively, showing an air bag apparatus according to a fifth embodiment of the present invention.
Figure 6B:
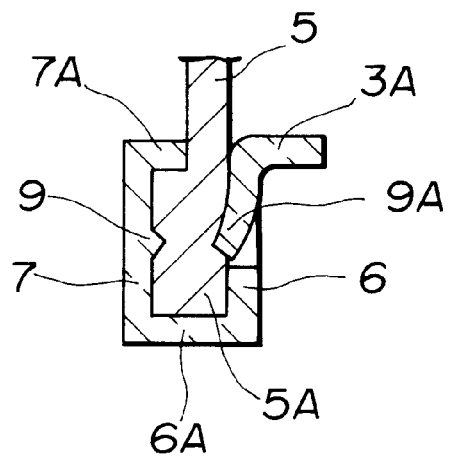

FIGS. 6(A) and 6(B) show an air bag apparatus according to a fifth preferred embodiment of the present embodiment. The air bag apparatus of this embodiment is similar to the air bag apparatus of the second embodiment of FIG. 3 described above, but is different in that arresting pawls 9 or riser pieces 9A serving as stopper means for preventing letting off of the terminal portions 5 of the pad cover 4 are provided on the side inner face portions 6 of the base plate 3.

FIG. 6(A) illustrates the air bag apparatus wherein arresting pawls 9 or riser pieces 9A serving as letting off preventing means for the terminal portions 5 of the pad cover 4 are provided only on the inner sides of the terminal portion flanges 5A. FIG. 6(B) shows the air bag apparatus wherein arresting pawls 9 or riser pieces 9A serving as stopper means for the terminal portions 5 of the pad cover 4 are provided on the both sides of the terminal portion flanges 5A.

Thus, upon caulking at the side outer face portions 7, the arresting pawls 9 or riser pieces 9A bite into side wall faces of the terminal portions 5 of the pad cover 4 to press the terminal portions 5 of the pad cover 4 strongly between the side outer face portions 7 and the terminal holding portions 7A of the base plate 3 and prevent letting off of the terminal portions 5 of the pad cover 4 with certainty.

Figure 7:
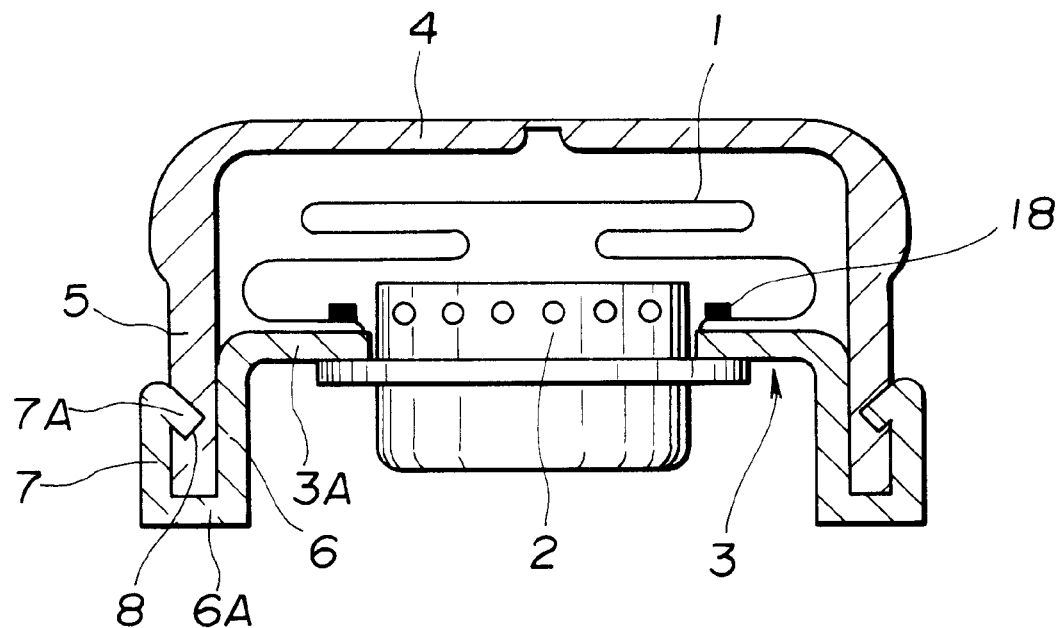
FIGS. 7(A) and 7(B) are a sectional view and a partial enlarged sectional view, respectively, showing an air bag apparatus according to a sixth embodiment of the present invention.
Figure 7:
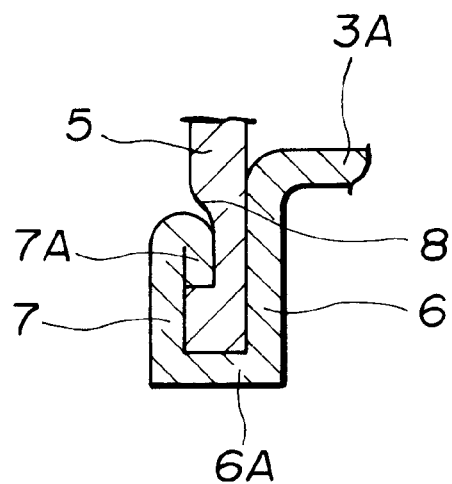

FIGS. 7(A) and 7(B) illustrate an air bag apparatus according to a sixth preferred embodiment of the present invention. The air bag apparatus of this embodiment is similar to the air bag apparatus of the third embodiment of FIG. 4, and the terminal portions 5 of the pad cover 4 are formed straight in the present embodiment. However, in the air bag apparatus shown in FIG. 7(A), the terminal holding portions 7A of the base plate 3 and the arresting grooves 8 formed in the terminal portions 5 of the pad cover 4 for receiving the terminal holding portions 7A are directed obliquely downwardly at an arcuate angle.

Meanwhile, in the air bag apparatus shown in FIG. 7(B), the terminal holding portions 7A of the base 5 plate 3 are further folded back until they extend in parallel to the side outer face portions 7 and are arrested at stepped portions at lower ends of the arresting grooves 8 formed in the terminal portions 5 of the pad cover 4.

Due to this construction, once the side outer face portions 7 are caulked, the terminal portions 5 of the pad cover 4 will not let off readily.

Figure 8A:
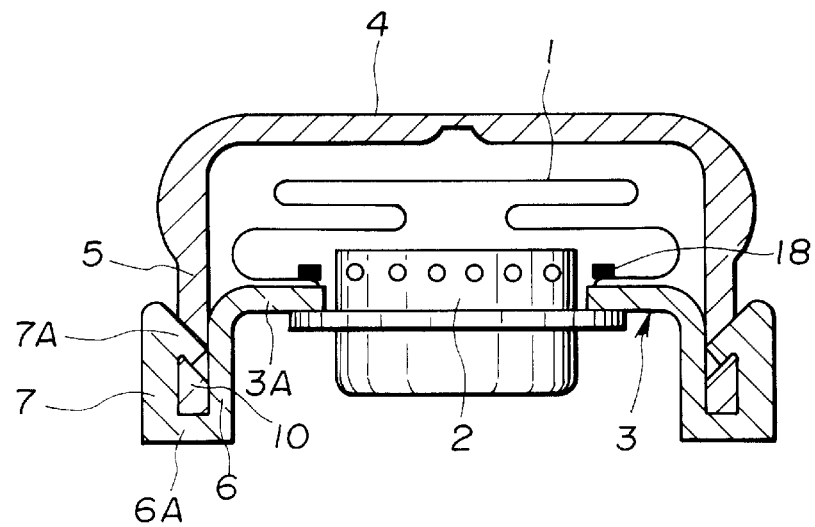
FIGS. 8(A), 8(B) and 8(C) are a sectional view, a partial enlarged perspective view and a partial enlarged sectional view, respectively, showing an air bag apparatus according to a seventh embodiment of the present invention.
Figure 8B:
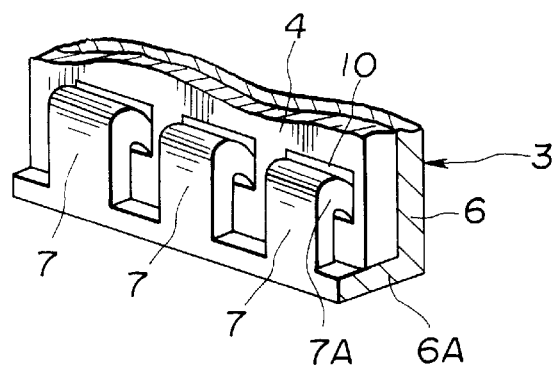
Figure 8C:
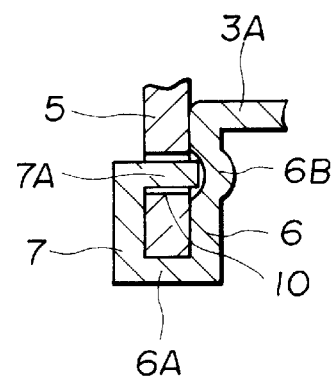

FIGS. 8(A), 8(B) and 8(C) illustrate an air bag apparatus according to a seventh preferred embodiment of the present invention. In this embodiment, as can be understood from FIG. 8(A), while the terminal holding portions 7A of the base plate 3 are directed obliquely downwardly at an acute angle similarly as in the air bag apparatus of the sixth embodiment of FIGS. 7(A) and 7(B), an arresting hole 10 which is directed obliquely downwardly at an acute angle is perforated in each of the terminal portions 5 for receiving the terminal holding portions 7A.

FIG. 8(B) shows the arresting portion of the arresting hole 10 described above. Referring to FIG. 8(B), a plurality of arresting holes 10 are perforated in each of the terminal portions 5 of the pad cover 4, and a plurality of side outer face portions 7 on which terminal holding portions 7A for engaging with the arresting holes 10 are provided are formed by folding back the base plate 3 by a plurality of times. The number, the width, the length, the shape and so forth of the terminal holding portions 7A can be set suitably in accordance with the shapes and the dimensions of different portions of the air bag.

Meanwhile, in the air bag apparatus shown in FIG. 8(C), the arresting holes 10 perforated in the terminal portions 5 of the pad cover 4 are formed in parallel to the bottom portions 6A of the base plate 3. Accordingly, also the terminal holding portions 7A of the side outer face portions 7 are inserted in parallel to and engaged with the bottom portions 6A.

Further, inner end portions of the terminal holding portions 7A are arrested at arresting recessed portions 6B formed on the side inner face portions 6 of the base plate 3.

By those elements, movement of any of the terminal portions 5 of the pad cover 4 is suppressed to provide a letting off preventing action for the terminal portion 5 of the pad cover 4 so that the entire pad cover 4 can be secured firmly to the base plate 3.

FIGS. 9(A) to 9(E) show air bag apparatus according to an eighth preferred embodiment of the present invention. The air bag apparatus of the present embodiment are modifications to the air bag apparatus of FIG. 8(C) in that the arresting hole 10 perforated in each of the terminal portions 5 of the pad cover 4 is formed in parallel to the bottom portions 6A of the base plate 3, and accordingly, a plurality of terminal holding portions 7A of the side outer face portions 7 formed by cutting and raising the side outer face portions 7 are inserted in parallel to and engaged with the bottom portions 6A.

Figure 9A:
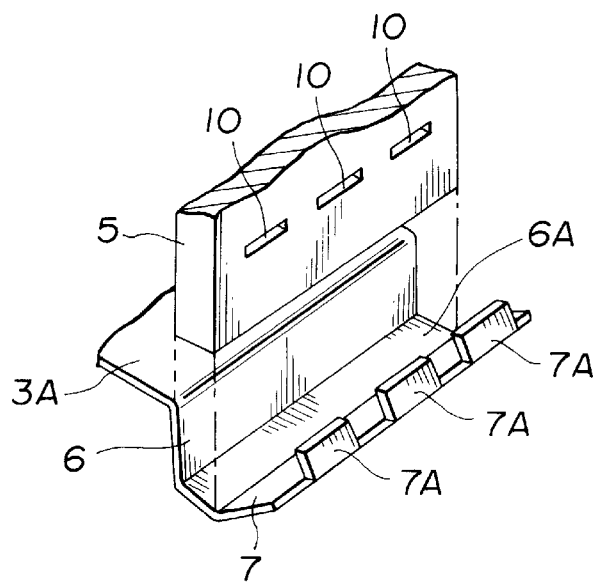
FIGS. 9(A), 9(B) and 9(C) are a perspective view and partial enlarged sectional views
Figure 9B:
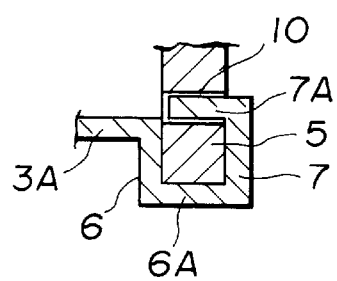

Further, an inner end portion of each of the terminal holding portions 7A is sufficiently inserted in the inside of an arresting hole 10 although such an arresting recessed portion 6B as is formed on the side inner face portion 6 of the base plate 3 of the air bag apparatus of FIG. 8(C) is not provided as shown in FIG. 9(B).

Figure 9C:
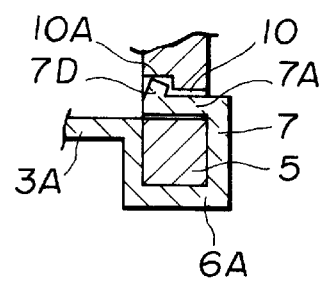

FIG. 9(C) shows the air bag apparatus wherein a terminal holding portion pawl 7D is formed at an inner end portion of each of the terminal holding portions 7A by bending. The terminal holding portion pawl 7D is arrested with certainty at a stepped portion of an enlarged arresting hole 10A formed in the arresting hole 10 of the corresponding terminal portion 5 of the pad cover 4.

Figure 9D:
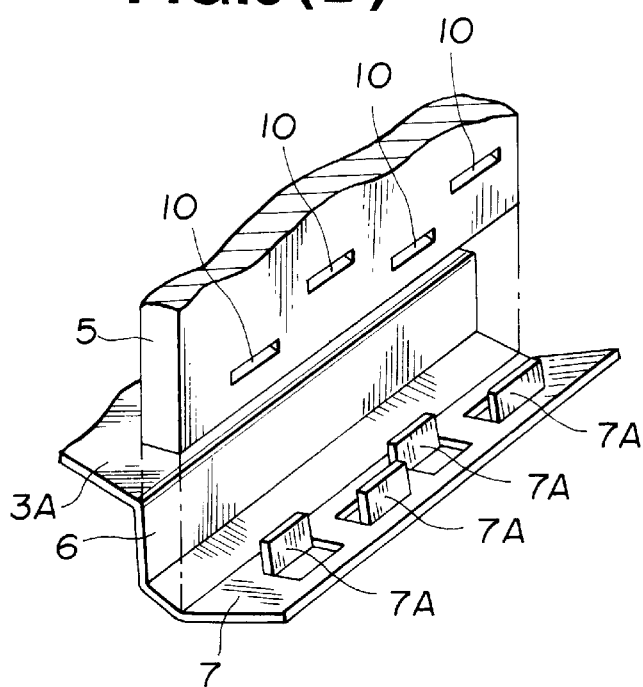
FIGS. 9(D) and 9(E) are a perspective view and a partial enlarged sectional view, respectively, showing air bag apparatus according to an eighth embodiment of the present invention.
Figure 9E:
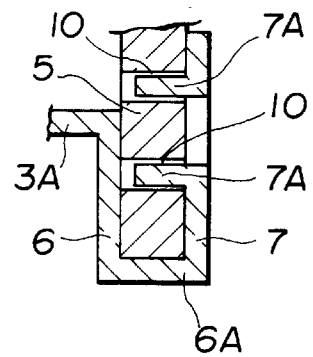

FIG. 9(D) illustrates the air bag apparatus which is a modification to the air bag apparatus of FIG. 9(C) described above in that a plurality of arresting holes 10 are perforated in a zigzag pattern at upper and lower locations on each of the terminal portions 5 of the pad cover 4. A plurality of riser pieces formed on the side outer face portion 7 of the base plate 3 by cutting and raising the side outer face portion 7 in a zigzag pattern in the opposite directions to each other are adopted as the terminal holding portions 7A to be arrested by the arresting holes 10. Thus, dual letting off preventing means is formed.

By those elements, movement of any of the terminal portions 5 of the pad cover 4 is suppressed to provide a complete letting off preventing action for the terminal portion 5 of the pad cover 4, and the entire pad cover 4 can be secured firmly to the base plate 3.

FIGS. 10(A) to 10(D) illustrate in air bag apparatus according to a ninth preferred embodiment of the present invention. While the air bag apparatus of this embodiment is similar to the air bag apparatus of FIGS. 8(A) to 8(C) and 9(A) to 9(D), the air bag apparatus of this embodiment is different from them in that, similarly as in the air bag apparatus shown in FIGS. 3(A) and 3(B), 5, and 6(A) and 6(B), a terminal portion flange 5A is formed at a terminal portion 5 of the pad cover 4, and a plurality of such terminal portion flanges 5A are provided intermittently such that they extend inwardly.

Figure 10A:
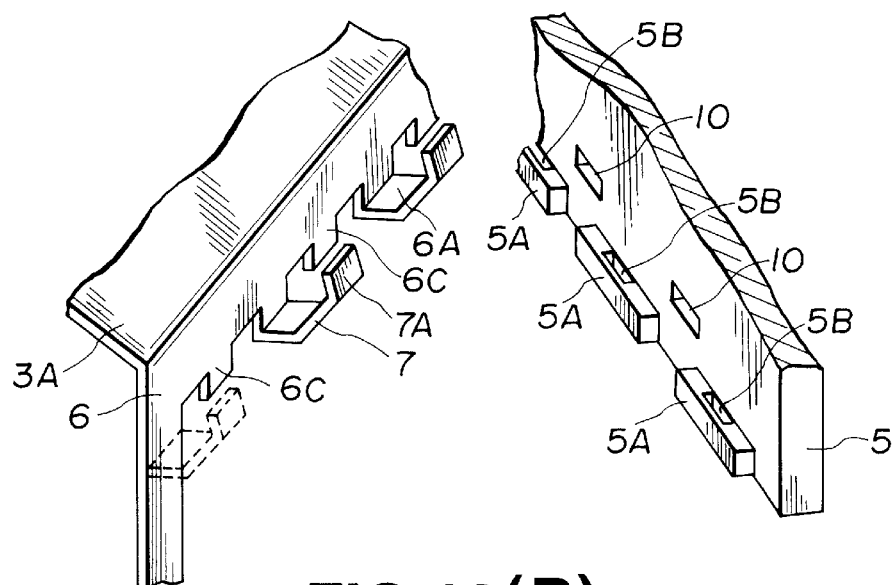
FIGS. 10(A) and 10(B) are an exploded perspective view and a partial enlarged sectional view and FIGS. 10(C) and 10(D) are a perspective view and a partial enlarged sectional view, respectively, showing air bag apparatus according to a ninth embodiment of the present invention.
Figure 10B:
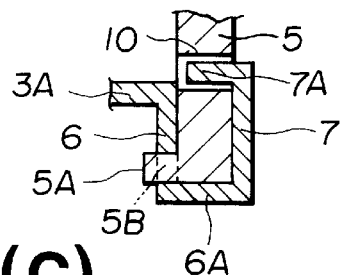

In the air bag apparatus of FIG. 10(A), elongated portions constituting the side outer face portions 7 and the terminal holding portions 7A which serve as caulking portions and tongue pieces 6C are formed alternately. Tongue piece insertion holes 5B for receiving the tongue pieces 6C are perforated in the vertical direction through the terminal portion flanges 5A.

Due to the construction described above, as can be recognized from FIG. 10(B), the entire pad cover 4 can be secured firmly to the base plate 3 by, in addition to the letting off preventing action provided by engagement of the terminal holding portions 7A with the arresting holes 10, another letting off preventing action provided by engagement between the tongue pieces 6C and the tongue piece insertion holes 5B.

Figure 10C:
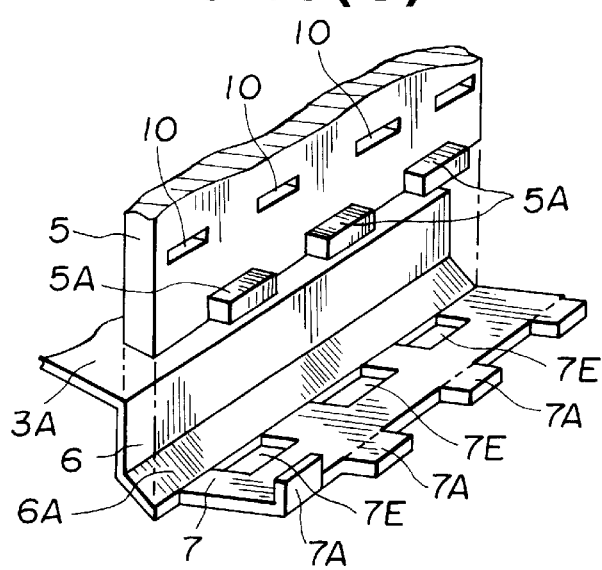

In the air bag apparatus of FIG. 10(C), a plurality of terminal portion flange insertion holes 7E are perforated in the side outer face portions 7 serving as caulking portions of the base plate 3, and the terminal holding portions 7A are formed intermittently at upper ends of the side outer face portions 7. Further, a plurality of terminal portion flanges 5A are formed intermittently toward the outer side on each of the terminal portions 5 of the pad cover 4, and a plurality of arresting holes 10 are perforated in each of the terminal portions 5.

Figure 10D:
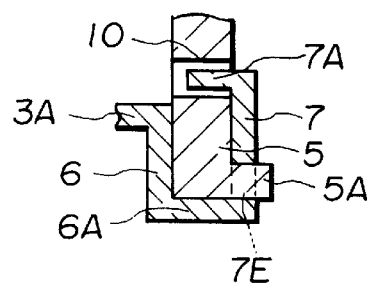

As can be recognized from FIG. 10(D), the terminal portion flanges 5A are inserted in and arrested by the terminal portion flange insertion holes 7E, and the terminal holding portions 7A are inserted in and arrested by the arresting holes 10.

Due to the construction described above, in addition to the letting off preventing action by the engagement of the terminal holding portions 7A with the arresting holes 10, another letting off preventing action by the engagement between the terminal portion flanges 5A and the terminal portion flange insertion holes 7E secures the entire pad cover 4 firmly to the base plate 3.

Figure 11:
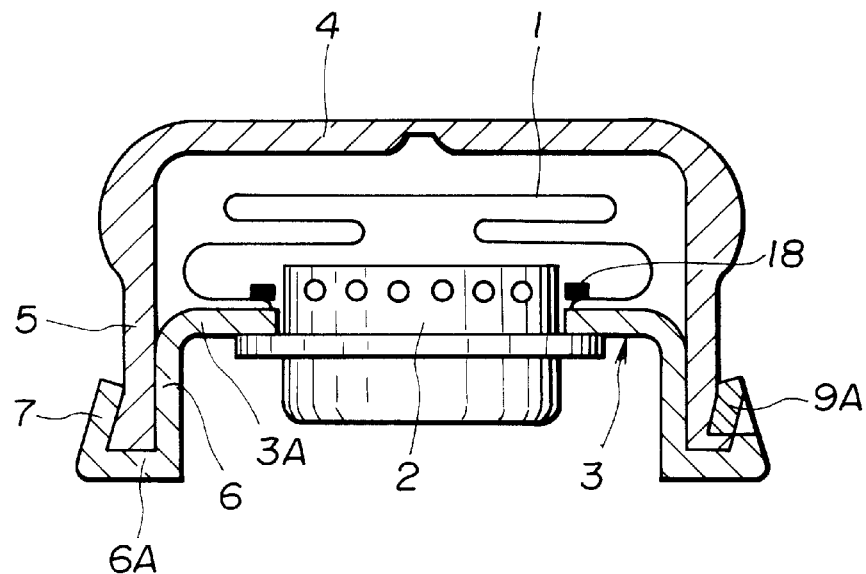
FIG. 11 is a sectional view showing an air bag apparatus according to a tenth embodiment of the present invention.

FIG. 11 illustrates an air bag apparatus according to a tenth preferred embodiment of the present invention. In this embodiment, the pad cover 4 has the terminal portions 5 which are each formed in a straight or in a slightly tapered profile such that it has a greater thickness at a lower portion thereof, and side outer face portions 7 of the base plate 3 are caulked such that they extend along the side wall faces of the terminal portions 5 of the pad cover 4. Thus, the air bag apparatus has a simplified structure.

In some cases, a riser piece 9A may be provided on each flattened side outer face portions 7 as shown on the right side in FIG. 11 in order to enhance the letting off preventing action.

Figure 12:
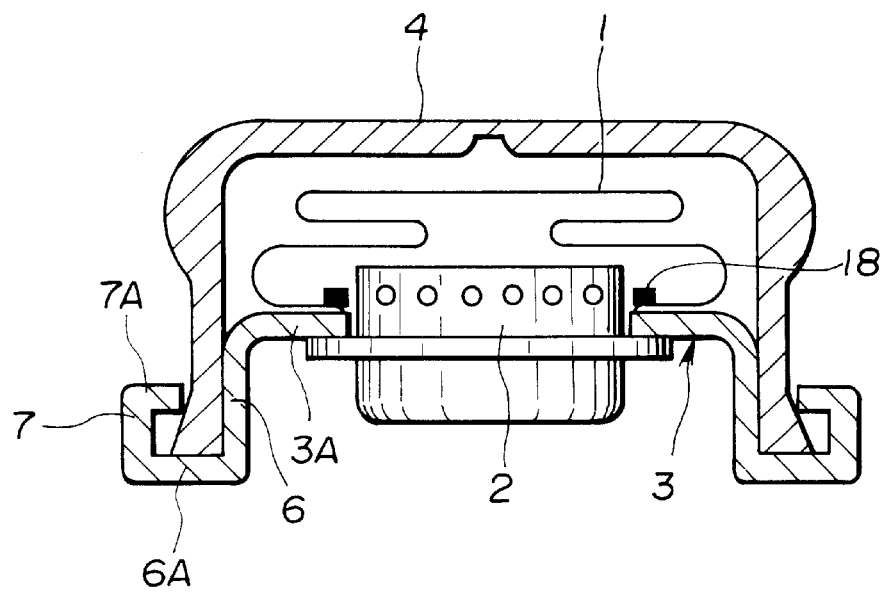
FIG. 12 is a sectional view showing an air bag apparatus according to an eleventh embodiment of the present invention.

FIG. 12 shows an air bag apparatus according to an eleventh preferred embodiment of the present invention. In this embodiment, the pad cover 4 has the terminal portions 5 similar to those in the eighth embodiment of FIG. 11. However, in order to caulk the side outer face portions 7 of the base plate 3 to press and hold the side wall faces of the terminal portions 5 of the pad cover 4, terminal holding portions 7A parallel to the flat plate portion 3A are opposed to the terminal portions 5 of the pad cover 4, and the terminal portions 5 of the pad cover 4 are held strongly by the edge action of corner portions of the terminal holding portions 7A.

Figure 13:
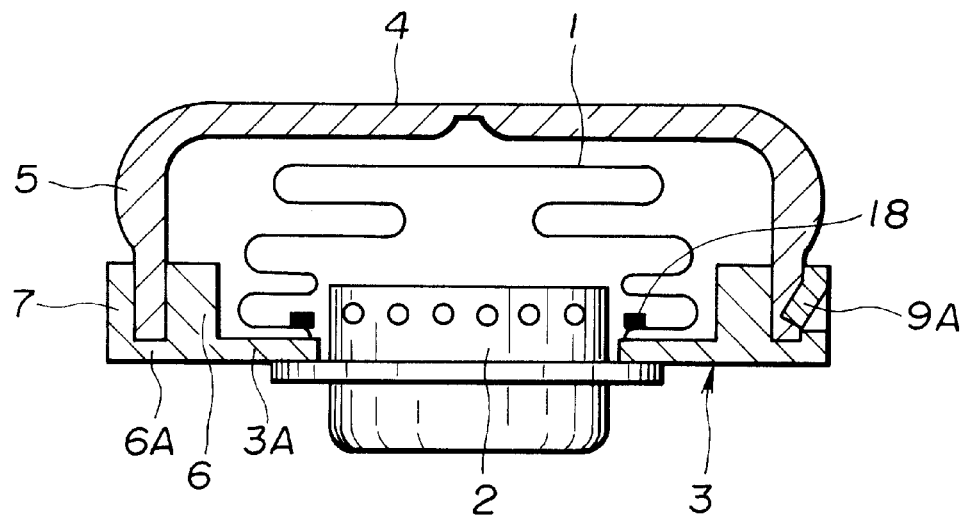
FIG. 13 is a sectional view showing an air bag apparatus according to an twelfth embodiment of the present invention.

FIG. 13 shows an air bag apparatus according to a twelfth preferred embodiment of the present invention. In this embodiment, the side inner face portions 6 of the base plate 3 are bent upwardly, that is, toward the drive and then folded back downwardly, whereafter they are bent outwardly in parallel to the flat plate portion 3A of the base plate 3 to form the bottom portions 6A, and then bent upwardly to form the side outer face portions 7. In this embodiment, similarly as in the eighth embodiment of FIG. 11 described above, the side outer face portions 7 of the base plate 3 are caulked such that they are provided along and pressed against the terminal portions 5 of the pad cover 4 which are formed substantially straight or in a slightly tapered profile such that each of them has a greater thickness at a lower portion thereof. Consequently, a simplification in structure can be achieved. Further, since the position of the flat plate portion 3A of the base plate 3 on which the air bag 1 and the gas generator 2 are mounted can be relatively displaced downwardly to the position of the lower ends of the terminal portions 5 of the pad cover 4 by the upwardly bent side inner face portions 6 of the base plate 3, the pad cover 4 can be formed with a maximum volume.

It is to be noted that a riser piece 9A serving as letting off preventing means may be provided on each of the side outer face portions 7 as shown on the right side of FIG. 13.

Figure 14:
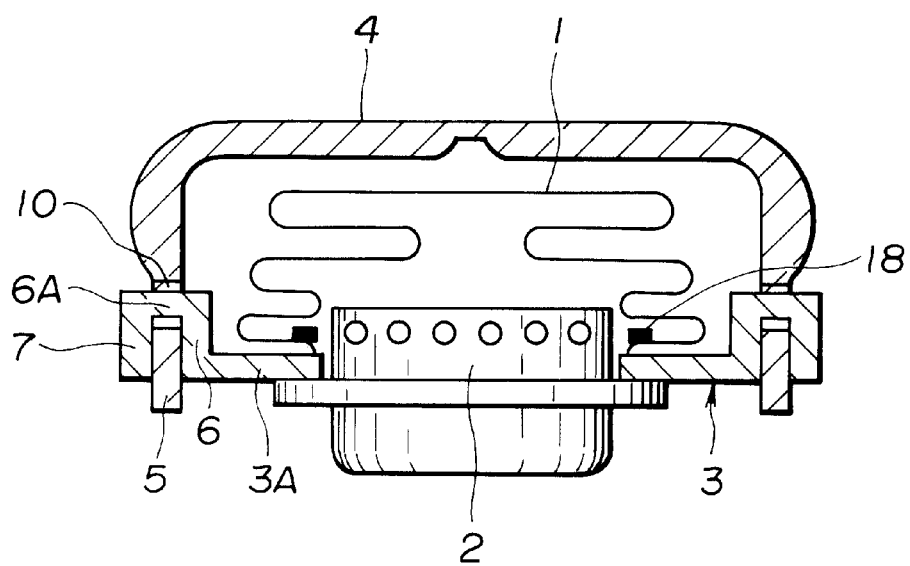
FIG. 14 is a sectional view showing an air bag apparatus according to an thirteenth embodiment of the present invention.

FIG. 14 illustrates an air bag apparatus according to a thirteenth preferred embodiment of the present invention. In this embodiment, while, similarly as in the tenth embodiment of FIG. 13 described above, the position of the flat plate portion 3A of the base plate 3 can be relatively displaced downwardly to the position of the lower ends of the terminal portions 5 of the pad cover 4 to assure a maximum volume for the pad cover 4, the air bag apparatus has a simplified structure.

In particular, the side inner face portions 6 of the pad cover 4 are first bent upwardly, that is, toward the driver and then bent outwardly in parallel to the flat plate portion 3A of the base plate 3 so that they are inserted into the arresting holes 10 perforated in the terminal portions 5 of the pad cover 4, and are further bent downwardly to form the side outer face portions 7.

In all of the structure described above, the portions of the base plate to which the pad cover is secured are open first, and the pad cover is secured only by deforming, after the base plate is combined with the pad cover, the base plate side into a predetermined shape to caulk the base plate to the pad cover, or in other words, only by deforming the base plate. However, naturally the base plate may be secured to the pad cover by means of riveting or the like in addition to caulking or by means of a structure wherein the base plate is fitted in a groove formed in the pad cover without employing caulking.

It is a matter of course that various combinations of shapes of the terminal portions of the pad cover and the base plate may be adopted within the scope of the present invention.

The inventors of the present invention made experiments of air bag apparatus according to the embodiments of the present invention described in detail above. In the experiments, expansion or inflation of an air bag apparatus was performed experimentally at −40° C. to 90° C. which provide an ordinary temperature range in which an air bag is used. The experiments proved that the air bag apparatus exhibited mounting strengths substantially equal to those of a conventional air bag apparatus, and exhibited good air bag expansion performances.

Besides, as a result of reduction in weight, also the steering performance of the steering wheel was improved.

Furthermore, as regards the number of parts, since bolts, rivets, stiffening plates, pawl plates or the like are not used at all, a reduction in weight compared with conventional parts was realized with this invention. Further, as regards the production cycle, the procedure which had required approximately 30 seconds for a conventional air bag apparatus was reduced to approximately 15 seconds.

As described in detailed above, according to the present invention, since the air bag apparatus which at least includes an air bag for protecting a driver of a vehicle upon collision of the vehicle, a base plate for mounting thereon a gas generator for inflating the air bag, and a pad cover secured to the base plate for accommodating the air bag and the gas inflator therein, is constructed such that part of the base plate is deformed into a predetermined shape to secure the pad cover to the base plate, and preferably, part of the base plate is bent to form a side inner face portion and is further folded back to form a side outer face portion and a terminal portion of the pad cover is held between and secured by the side outer face portion and the side inner face portion of the base plate, by deforming part of the base plate into the predetermined shape, the caulking portion is formed. Consequently, the terminal portion of the pad cover can be mounted on the base plate with a sufficient strength with a simple structure.

Further, concerning the mounting parts, it is required to prepare only the pad cover and the base plate and the base plate itself has a weight which is at an equal level to that of a conventional base plate without requiring any additional members, the air bag apparatus contributes very much to the improvement in operability, reduction in part cost and reduction in weight. Consequently, a total reduction in cost can be achieved.

Further, where the pad cover terminal letting off preventing means is provided on the side outer face portion or the side inner face portion of the base plate or the arresting groove or the arresting hole for engaging with the letting off preventing means is provided at the terminal portion of the pad cover, a pad cover broken at a planned break line upon operation of the air bag is blown off can be prevented fully.

In addition, where the side inner face portion of the base plate is bent first toward the driver, the position of the base plate can be relatively displaced downwardly, and the pad cover can have a maximum volume.

Figure 15:
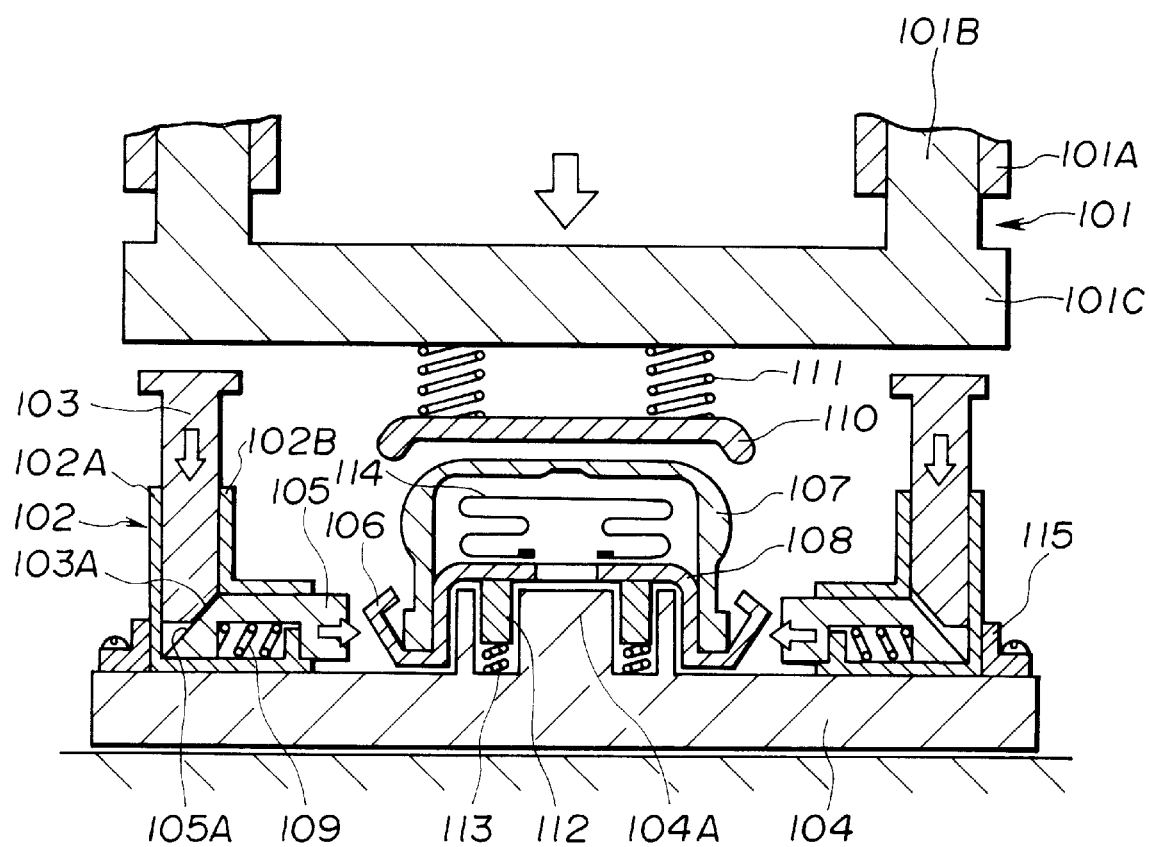
FIG. 15 is a sectional view taken along line A—A of FIG. 16 illustrating an assembling method and an assembling apparatus for an air bag apparatus according to a fourteenth embodiment of the present invention.
Figure 16:
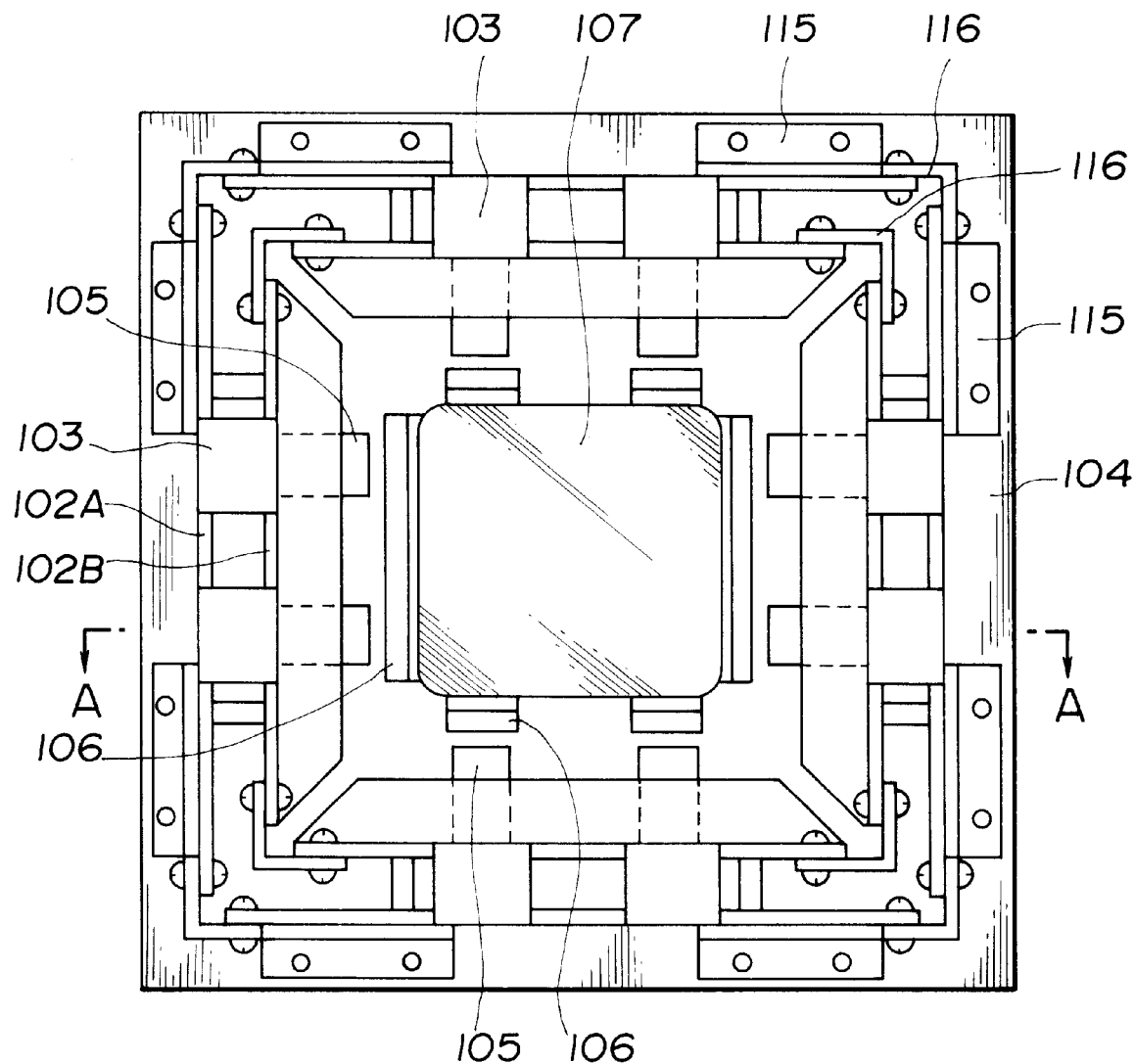
FIG. 16 is a plan view illustrating the assembling method and the assembling apparatus for the air bag apparatus of FIG. 15 except a pressing portion side of a press apparatus shown in FIG. 15.

FIGS. 15 and 16 illustrate a method of assembling the air bag apparatus of the present invention described above and also show an embodiment of an assembling apparatus for the air bag apparatus.

FIG. 16 is a plan view showing a press apparatus 101 with a pressing portion thereof removed.

Referring to FIG. 15 which shows a sectional view taken along line A—A of FIG. 16, an air bag apparatus serving as a workpiece wherein leg portions 107A of a pad cover 107 for accommodating an air bag 114 and so forth therein are temporarily placed on caulking portions 106 of a base plate 108 on which the air bag 114 and so forth are mounted is placed onto a work receiving table 104A provided substantially at a central portion of a press base 104. In this instance, the air bag apparatus urges a plurality of protruding pins 112 downwardly. The protruding pins 112 are embedded in the work receiving table 104A and have biasing springs 113 for resiliently projecting the air bag apparatus as a work to take out the same after assembly. When a pressing portion 101C of the press apparatus 101 begins to be moved downwardly by a piston rod 101B in a hydraulic cylinder 101A to start a compression operation, an upper face of the pad cover 107 of the air bag apparatus is first held by a holding frame 110 provided at a lower portion of the pressing portion 101C with biasing springs 111 interposed therebetween and then presses pairs of press blocks 103 of the cam slide apparatus 102, each of which is constituted from press blocks 103 disposed on the press base 104 and slidably movable in a vertical direction and a caulking block 105 which is located, at a cam face 105A thereof, adjacent cam faces 103A of the press blocks 103 and slidably movable in a horizontal direction, downwardly as indicated by an arrow mark. Consequently, the cam faces 103A which are inclined at lower ends thereof act upon the cam faces 105A of the caulking blocks 105 to slidably move the caulking blocks 105 in horizontal directions as indicated by arrow marks to deform the caulking portions 106 of the base plate 108. Thus, the caulking portions 106 of the base plate 108 are fastened and secured firmly to the leg portions 107A of the pad cover 107.

After the caulking step is completed, the pressing portion 101C is retracted upwardly, whereupon the caulking blocks 105 and the press blocks 103 are returned to their original positions by return springs 109 built in the caulking blocks 105. Simultaneously, the air bag apparatus as a workpiece is resiliently projected upwardly by the protruding pins 112 having the biasing springs 113 embedded in the work receiving table 104A, and consequently, the air bag apparatus can be taken out readily.

Each of the cam slide apparatus 102 for converting the pressing forces in vertical directions into caulking forces in horizontal directions includes, as shown in a plan view in FIG. 16, an outer frame 102A and an inner frame 102B disposed around the air bag apparatus as a workpiece and each having a substantially square shape. The outer frame 102A and the inner frame 102B are secured at corner portions thereof for adjustment in fixed positions thereof by fixing angles 116. In particular, the outer frame 102A and the inner frame 102B have dimensions which can be adjusted in accordance with the magnitude of the work. In this instance, holding angles 115 for holding the outer frames 102A from the outside have an elongated hole 115A formed therein so that the amount of the adjustment can be absorbed.

A number of blocks each including a pair of press blocks 103 and a caulking block 105 for converting the pressing force in a vertical direction into a caulking force in a horizontal direction are disposed in accordance with the number and the positions of the caulking portions 106 of the base plate 108 to be caulked around the work on the square cam slide apparatus 102 such that one or a plurality of ones of the caulking portions 106 are deformed at a time to secure the work.

Figure 17:
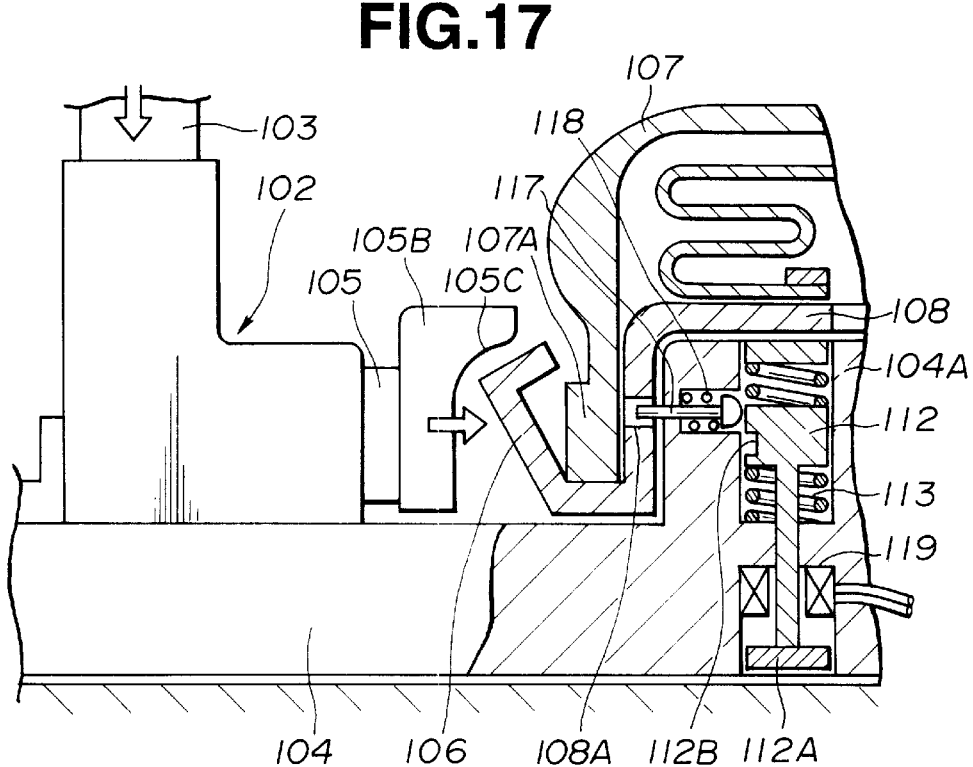
FIG. 17 is a partial sectional view showing a fifteenth embodiment of the present invention.

FIG. 17 illustrates an air bag assembly apparatus according to a fifteenth preferred embodiment of the present invention.

In the present embodiment, when a caulking portion 106 is pushed to be deformed in a horizontal direction by a caulking block 105, the base plate 108 as a workpiece is prevented from inadvertently moving upwardly, and the shape upon ending of caulking is stable.

The air bag assembly apparatus is characterized in that a holding piece 105B for suppressing inadvertent upward movement of a caulking portion 106 of the base plate 108 upon caulking is provided at an end of each of the caulking blocks 105 of the cam slide apparatus 102, and a holding face 105C of a shape which extends along a locus of deformation of an upper end of the caulking portion 106 is formed on a front face of the holding piece 105B.

Further, if an arresting pin 117 which is moved when the base plate 108 of the air bag apparatus as a work is placed properly on protruding pins 112 embedded in the work receiving table 104A, by downward movement of the protruding pins 112 by a cam face or the like and arrested by pin holes 108A (mounting holes used to mount the air bag apparatus onto a steering wheel or the like of an automobile) or the like of the base plate 108 is embedded, then inadvertent upward movement of the base plate 108 upon caulking at the caulking blocks 105 can be suppressed with certainty only by placing the work properly onto the work receiving table 104A. Removal of the arresting pin 117 from the pin hole 108A is allowed by accommodation of the arresting pin 117 into a cam groove 112B of the corresponding protruding pin 112 as a result of upward movement of an armature 112A attracted by a solenoid 119 which is provided at a lower portion of the work receiving table 104A and energized in response to movement of the pressing portion 101C which is retraced upwardly upon completion of the caulking step.

Figure 18:
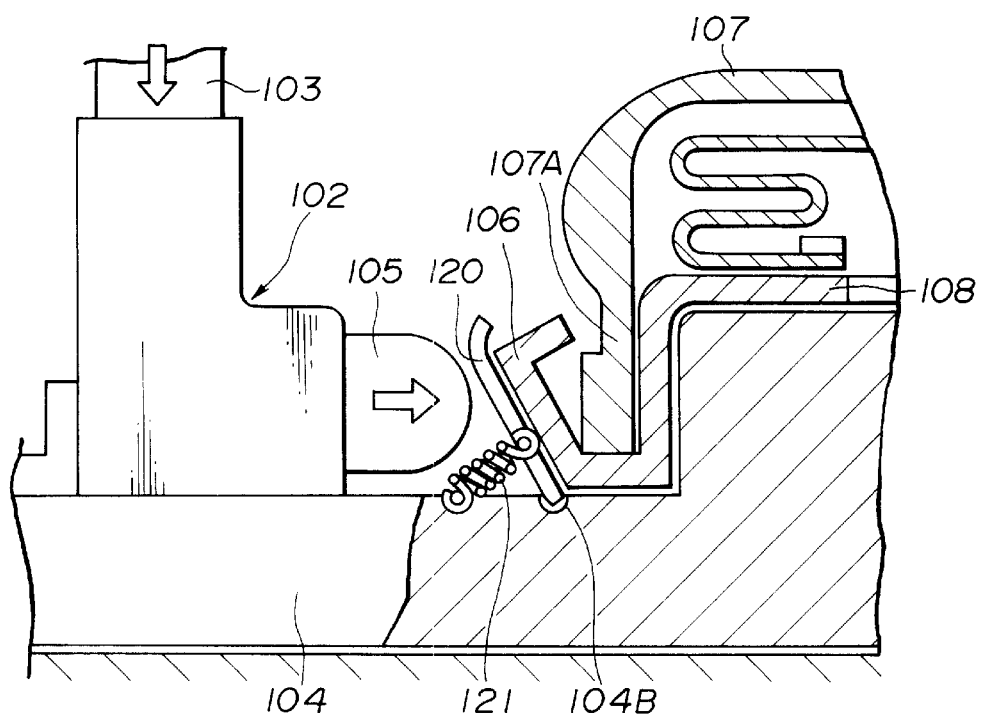
FIG. 18 is a partial sectional view showing a sixteenth embodiment of the present invention.

FIG. 18 illustrates an air bag assembly apparatus according to a sixteenth preferred embodiment of the present invention.

In this embodiment, the air bag apparatus is characterized in that a stiffening plate 120 having a fulcrum 104B on the press base 104 is disposed between an end of each of the caulking blocks 105 of the cam slide apparatus 102 and a corresponding caulking portion 106 of the base plate 108 as a work, and the end of the caulking block 105 is formed as an arcuate face so that it may not damage the stiffening plate 120.

The stiffening plate 120 is held in a slightly inclined relationship at an original position by a holding spring 121 and is tilted by protrusion of the caulking block 105 pulling the holding spring 121 to perform a caulking operation along the caulking portion 106 of the base plate 108. An upper end of the stiffening plate 120 may be slightly bent in order to suppress upward inadvertent movement of the caulking portion 106. After the caulking operation, the stiffening plate 120 is returned to the original position by the holding spring 121. The inclined stiffening plates 120 at their original position effect, if they are disposed around the air bag apparatus as a work, a positioning action upon proper placement of the air bag apparatus onto the work receiving table 104A.

Figure 19:
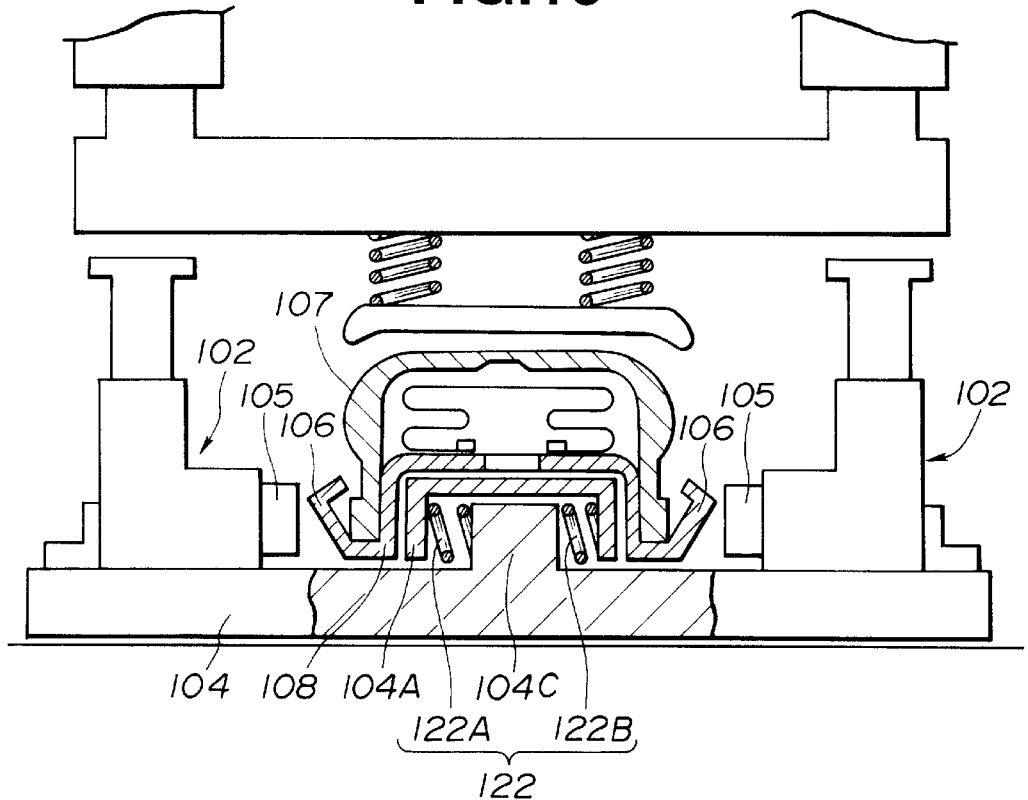
FIG. 19 is a partial sectional view showing a seventeenth embodiment of the present invention.

FIG. 19 illustrates an air bag assembly apparatus according to a seventeenth preferred embodiment of the present invention.

In this embodiment, the air bag assembly apparatus is characterized in that the work receiving table 104A is disposed for movement in a horizontal direction on the press base 104 with a balancing spring 122 interposed therebetween. The work receiving table 104A is formed to have a tray-shaped cross section and is disposed in such a manner as to cover over a pressing portion 104C provided on the press base 104 so that it may be moved leftwardly and rightwardly in horizontal directions (when necessary, also in forward and backward directions). A pair of balancing springs 122A and 122B are disposed between the opposite sides of the pressing portion 104C and the inner side of the work receiving table 104A.

Due to this construction, even if an error in deformation is caused by some causes in a temporary deforming operation of the caulking portions 106 prior to a caulking operation and the caulking portions 106 are placed as they are onto the work receiving table 104A and consequently some imbalance is produced between the caulking forces by the caulking blocks 105 of the left and right cam slide apparatus 102, the work receiving table 104A is moved either leftwardly or rightwardly by an action of the balancing spring 122 to absorb the difference in dimension caused by the error in deformation so that the left and right caulking portions 106 can be caulked equally.

Figure 20:
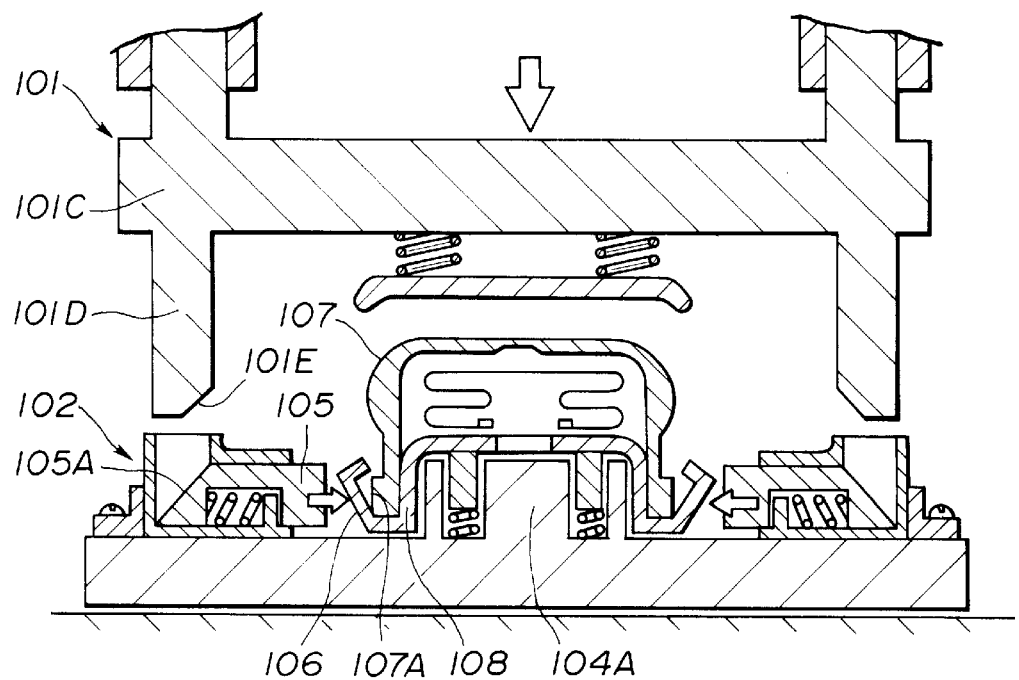
FIG. 20 is a sectional view showing an eighteenth embodiment of the present invention.

FIG. 20 illustrates an air bag assembly apparatus according to an eighteenth preferred embodiment of the present invention.

While, in the embodiments described above, each of the cam slide apparatus 102 for converting the pressing force in a vertical direction into a caulking force in a horizontal direction is constituted from a pair of press blocks 103 mounted for sliding movement in a vertical direction and a caulking block 105 which is provided adjacent the press blocks 103 by way of a cam face thereof and is slidably moved in a horizontal direction while the press blocks 103 are components of the cam slide apparatus 102, in the present embodiment, the air bag assembly apparatus is characterized in that the press blocks 103 are formed integrally as press blocks 101D at lower portions of the pressing portion 101C of the press apparatus 101. A cam face 101E is formed at a lower end portion of each of the press block 101D, and the press blocks 101D are disposed in such a positional relationship that the cam faces 101E conform to cam faces 105A of the caulking blocks 105 of the corresponding cam slide apparatus 102 which are slidably moved in a horizontal direction.

If necessary, the press blocks 101D are secured to the pressing portion 101C of the press apparatus 101 such that the positions thereof can be adjusted so that they may correspond to the positions of the cam slide apparatus 102 which are adjusted in accordance with the size of the work.

Figure 21:
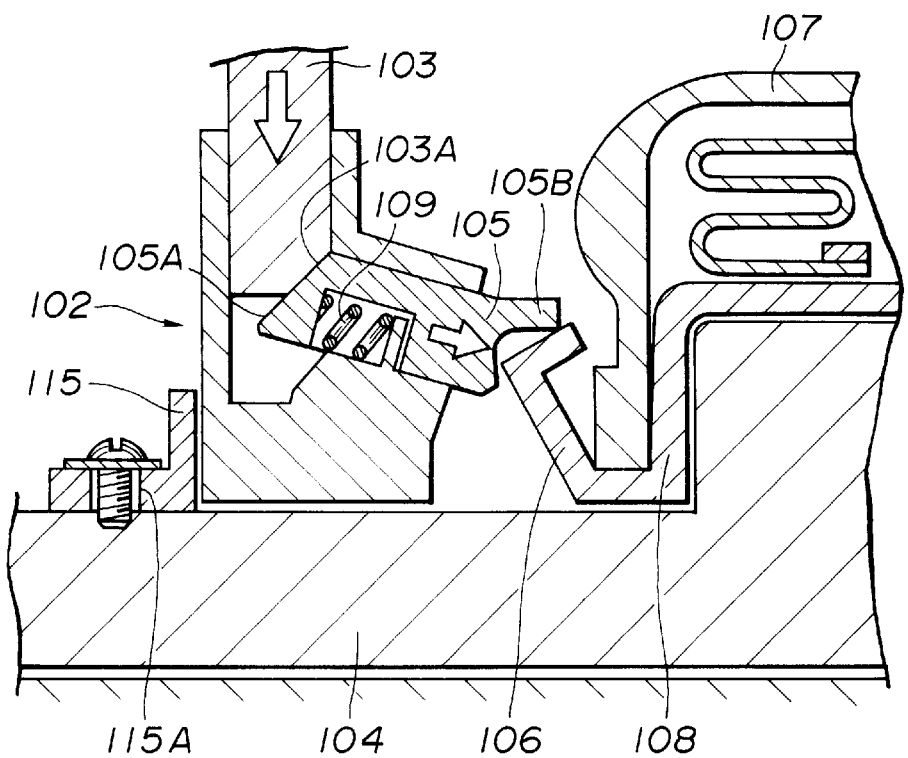
FIG. 21 is a partial sectional view showing a nineteenth embodiment of the present invention.

FIG. 21 illustrates an air bag assembly apparatus according to a nineteenth preferred embodiment of the present invention.

In this embodiment, the air bag apparatus is constructed such that, similarly as in the fifteenth embodiment shown in FIG. 17, when a caulking portion 106 of the base plate 108 is pushed to be deformed in a horizontal direction by a corresponding caulking block 105, it is prevented that the caulking portion 106 is inadvertently moved upwardly. While it is similar as in the fifteenth embodiment described above that the holding pieces 105B are provided at the ends of the caulking blocks 105 of the cam slide apparatus 102, in the present embodiment, the caulking blocks 105 are disposed in an inclined relationship in the cam slide apparatus 102 such that each of them may be slidably moved in a little obliquely downward direction.

Due to this construction, the pressing force in a vertical direction of each of the press blocks 103 pressed by the press apparatus is converted into a slightly obliquely downwardly acting caulking force of a caulking block 105 by way of the cam faces 103A and the cam face 105A, and consequently, the holding piece 105B at the end of each of the caulking blocks 105 prevents inadvertent upward movement of the corresponding caulking portion 106 effectively.

Figure 22:
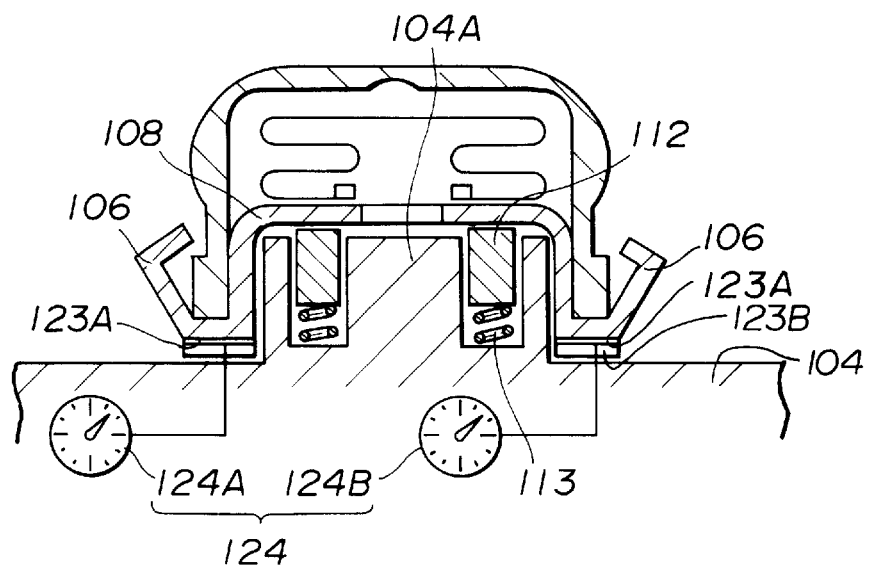
FIG. 22 is a partial sectional view showing a twentieth embodiment of the present invention.

FIG. 22 shows an air bag assembly apparatus according to a twentieth preferred embodiment of the present invention.

In this embodiment, it is detected whether or not the base plate 108 of the air bag apparatus as a work has been set properly to the work receiving table 104A.

A pair of pressure gauges 123A and 123B which indicate, when the base plate 108 of the air bag apparatus as a work is placed properly such that it is urged upwardly by the protruding pins 112 embedded in the work receiving table 104A and having the urging springs 113, predetermined numerical values depending upon the balance with the biasing springs 113 are provided at lower portions of the caulking portions 106 on the press base 104. Reference characters 124A and 124B denote pressure gauges which indicate pressure signals from the pressure gauges 123A and 123B, respectively.

It is to be noted that naturally the pressure gauges 123A and 123B may be replaced by suitable sensors such as optical sensors or the like for detecting that the base plate 108 as a work has been set properly onto the work receiving table 104A.

Figure 23:
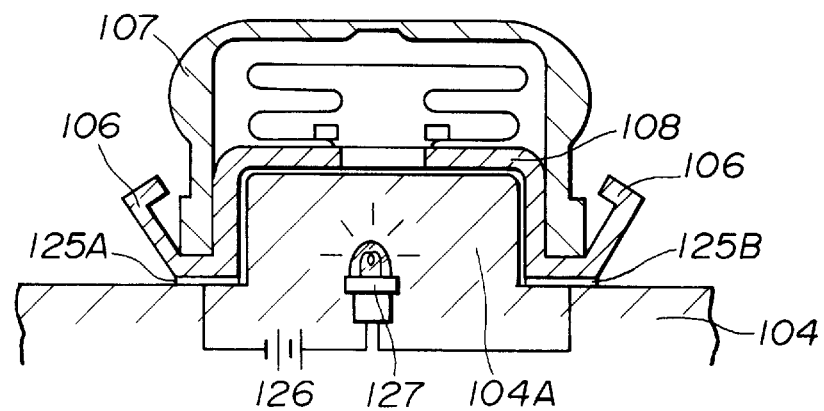
FIG. 23 is a partial sectional view showing a twenty - first embodiment of the present invention.

FIG. 23 shows an air bag assembly apparatus according to a twenty-first preferred embodiment of the present invention.

Also in this embodiment, it is detected whether or not the base plate 108 of the air bag apparatus as a work has been set properly to the work receiving table 104A. When the base plate 108 is placed properly onto the press base 104, a pair of conductive electrodes 125A and 125B provided at lower portions of the caulking portions 106 on the press base 104 are both put into a conducting state with the conductive base plate 108 so that a power source circuit for an indicator lamp is closed to light an indicator lamp 127. Reference numeral 126 denotes a power source.

It is to be noted that naturally the electrodes 125A and 125B may be replaced by pressure switches which are placed into a conducting state to close the circuit for an indicator lamp to light the indicator lamp 127 when the base plate 108 is placed properly onto the press base 104.

Figure 24:
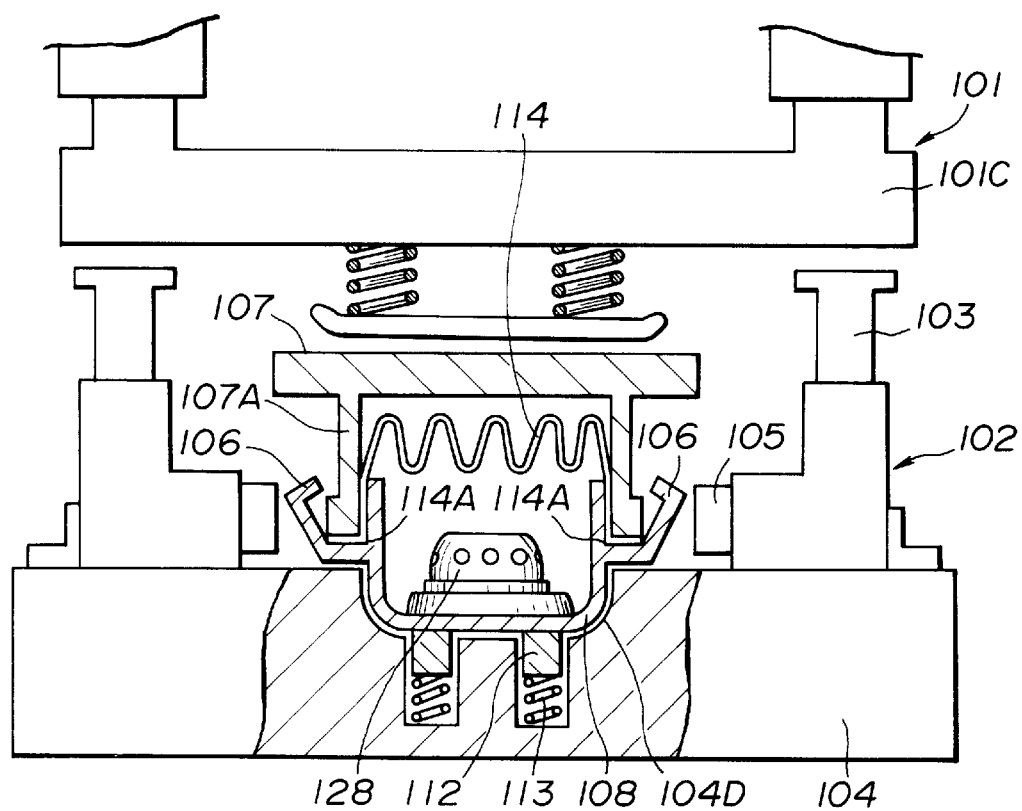
FIG. 24 is a partial sectional view showing a twenty - second embodiment of the present invention.
Figure 25:
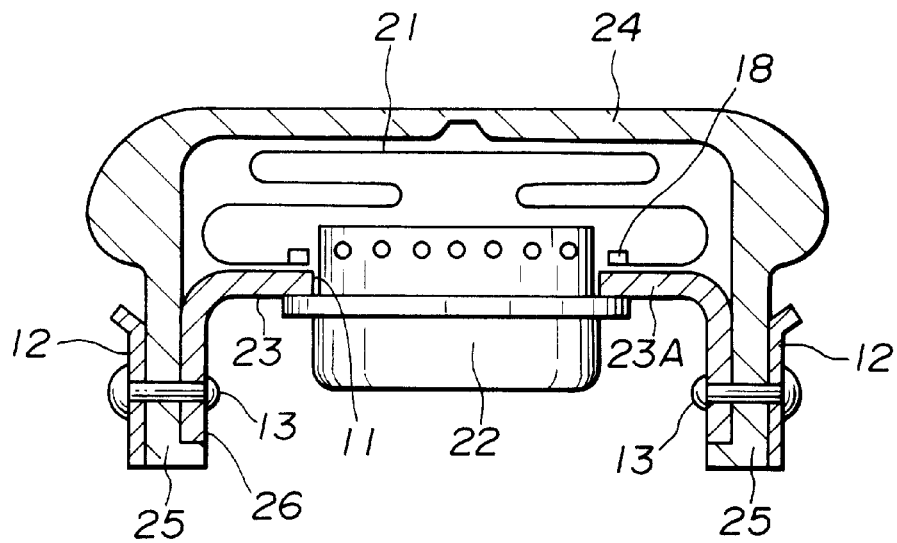
FIG. 25 is a sectional view showing a conventional air bag apparatus.
Figure 26:
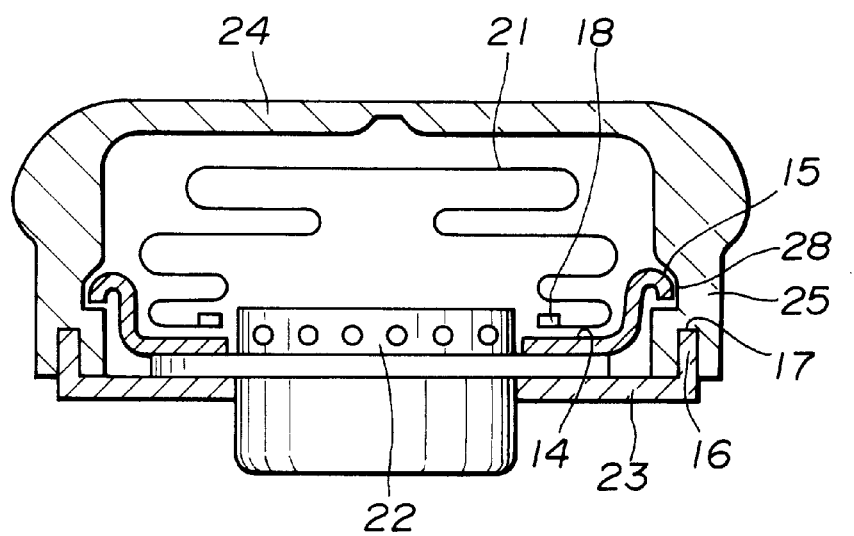
FIG. 26 is a sectional view showing another conventional air bag apparatus.

FIG. 24 shows an air bag assembly apparatus according to a twenty-second preferred embodiment of the present invention.

This embodiment is applied to an air bag apparatus for the passengers' seat. The air bag apparatus as a workpiece wherein the leg portions 107A of the pad cover 107 for accommodating the air bag 114 for the passengers' seat and so forth therein and the terminal portions 114A of the air bag 114 are temporarily placed on the caulking portions 106 of the base plate 108 for the passengers' seat on which the air bag 114, an inflator 128 and so forth are mounted is placed onto the work receiving table 104D provided substantially at the central portion of the press base 104. In this instance, the air bag apparatus urges the protruding pins 112, which are embedded in the work receiving table 104D and have the biasing springs 113 for projecting the air bag apparatus so as to allow removal of the same after assembly, downwardly. A description of a caulking step after that is omitted herein since it is similar to that in the embodiments described.

In the present embodiment, since the caulking portions 106 of the base plate 108 are caulked together with the terminal portions 114A of the air bag 114 dragged in at least to a location below the leg portions 107A of the pad cover 107 to fasten the air bag, a saving in the required power of the assembling step can be realized. The present method of caulking the caulking portions 106 of the base plate 108 together with the terminal portions 114A of the air bag 114 dragged in at least to the location below the leg portions 107A of the pad cover 107 to secure the caulking portions 106 of the base plate 108 to the leg portions 107A of the pad cover 107 can naturally be adopted to the air bag apparatus of any of the embodiments described hereinabove.

It is to be noted that the terminal portions 114A of the air bag 114 dragged in at least to the location below the leg portions 107A of the pad cover 107 may be further dragged back to a location outwardly of the leg portions 107A of the pad cover 107.

While the embodiments of the present invention are described above, it is a matter of course that the shape of the press apparatus, the shapes of the press blocks and the caulking blocks and the shapes of the cam faces of them, the shapes of the cam slide apparatus and the frame for the cam slide apparatus, the arrangement and the shapes of the press blocks and the caulking blocks of the cam slide apparatus, the shapes of the holding pieces and the holding faces of the holding pieces and so forth can be adopted suitably within the scope of the subject matter of the present invention.

The inventors of the present invention attempted to produce air bags using the assembling methods and the assembling apparatus for an air bag apparatus according to the embodiments of the present invention described in detail above. The attempt established that 7 seconds were required for setting of a workpiece; 5 seconds were required for a caulking operation; and 3 seconds were required for removal of the workpiece, and consequently, a total of approximately 15 seconds were required to complete all of the steps.

Since the conventional step according to the riveting method required about 30 seconds even when a robot was used, the time required for the production was reduced remarkably.

Further, with regard to the quality of assembly, the strokes of the press apparatus and the cam slide parts were able to be monitored in units of 0.1 mm to 0.5 mm, and it was also possible to conform a degree of finish by visual observation and easy to discriminate an article to be rejected.

As described in detail above, according to the present invention, since the assembling method for an air bag apparatus wherein caulking portions formed by bending part of a base plate on which an air bag for protecting a driver of a vehicle upon collision of the vehicle and a gas generator for expanding the air bag are mounted hold between leg portions of a pad cover in which the air bag and the gas generator are accommodated to secure the pad cover, is constructed such that one or a plurality of ones of the caulking portions of the base plate to be caulked to the leg portions of the pad cover are deformed at a time to secure the base plate to the pad cover by means of a cam slide apparatus which is disposed around the air bag apparatus as a workpiece for converting a pressing force in a vertical direction into a caulking force acting in a horizontal direction or acting in a circumferential direction around a fulcrum, if only the pad cover and the base plate are prepared as mounting parts, the caulking portions of the base plate can be fastened and secured firmly to the leg portions of the pad cover. Thus, an improved air bag apparatus which realizes a reduction in part cost and reduction in weight and has a sufficient strength with a simplified structure can be assembled readily and with certainty in a short period of time.

Additionally, it is possible to caulk the caulking portions of the base plate together with the terminal portions of the air bag which are dragged in at least to the location below the leg portions of the pad cover to fasten the air bag, and save in power of the assembling step can be realized.

Since the press blocks and the caulking blocks of the cam slide apparatus are disposed by a suitable plural number around the work corresponding to the number of the caulking portions, the number of caulking portions can be caulked at a time by the corresponding caulking blocks by the downwardly moving compression operation of the pressing portion of the press apparatus. This remarkably contributes to improvement in the assembling performance and the productivity.

Furthermore, since the weight of the apparatus is reduced, the steering performance of the steering wheel is improved where the air bag apparatus is provided for the driver's seat. Further, also with regard to the number of parts, since bolts, rivets, stiffening plates, pawl plates or the like are not used at all, reduction in weight as compared with conventional air bag apparatus can be realized.

Japanese Patent Application No. 5- 292177 and No. 6-33328 are incorporated herein by reference.

What is claimed is:

1. An air bag apparatus for protecting a driver of a vehicle, said air bag apparatus comprising: an air bag, a base plate for mounting thereon a gas generator for inflating said air bag, and a pad cover secured to said base plate for accommodating said air bag and said gas generator therein, wherein a portion of said base plate is a unitary component having a portion configured by turning in a downward direction to form a side inner face portion and turning outwardly to form a bottom portion contiguous to the side inner face portion, and a lower end of a terminal portion of the pad cover having a terminal flange thereon is disposed along the side inner face portion and the bottom portion, and the bottom portion turned back upward and inward to enclose the terminal portion flange of said pad cover and form a side outer face portion so that the terminal portion of the pad cover is held and retained between to the side outer face portion and the side inner face portion, thereby forming a caulking portion for said terminal flange.

2. An air bag apparatus as claimed in claim 1, wherein pad cover terminal letting off preventing means is provided on said side outer face portion.

3. An air bag apparatus as claimed in claim 2 wherein an arresting groove for engaging said letting off preventing means is provided at said terminal portion of said pad cover.

4. An air bag apparatus as claimed in claim 1 further comprising an arresting groove provided at said terminal portion of said pad cover.

* * * * *